(12) United States Patent
Suzuki

(10) Patent No.: US 6,408,677 B1
(45) Date of Patent: Jun. 25, 2002

(54) CALIBRATION DISK HAVING DISCRETE BANDS OF COMPOSITE ROUGHNESS

(75) Inventor: Shoji Suzuki, San Jose, CA (US)

(73) Assignee: Komag Corporation, San Jose, CA (US)

(*) Notice: Subject to any disclaimer, the term of this patent is extended or adjusted under 35 U.S.C. 154(b) by 52 days.

(21) Appl. No.: 09/633,434

(22) Filed: Aug. 7, 2000

Related U.S. Application Data

(63) Continuation-in-part of application No. 09/164,208, filed on Sep. 30, 1998, now Pat. No. 6,164,118.

(51) Int. Cl.$^7$ ................................ G01B 5/28
(52) U.S. Cl. ..................................... 73/1.89
(58) Field of Search ............... 73/1.89, 105; 350/243.3, 350/243.4

(56) References Cited

U.S. PATENT DOCUMENTS 2,715,830 A * 8/1955 Lewis et al. .................. 73/1.89
3,087,329 A * 4/1963 Grodek et al. ................. 73/105
5,689,057 A * 11/1997 Baumgart

* cited by examiner

Primary Examiner—Robert Raevis
(74) Attorney, Agent, or Firm—Skjerven Morrill LLP

(57) ABSTRACT

A calibration disk includes calibration areas that allow a glide head to be calibrated as to the glide's head's avalanche height, fly height and the like. The calibration areas may be, for example, configured in a circumferential band (or, alternatively, a series of circumferential bands extending substantially concentric to one another), one or more spiral bands or some other suitable configuration. Such bands can, for example, extend from adjacent an outer diameter of the calibration disk to adjacent an inner portion of the calibration disk. Each of the circumferential bands is a textured area on the calibration disk having a given degree of composite roughness, as measured by the given circumferential band's average composite roughness height, and as such is referred to herein as a calibration band. Preferably, the given circumferential band is textured in a uniform manner, sufficient to produce a constant and continuous output signal from a sensor mounted on a glide head when the glide head flies lower than a maximum composite roughness height. Also preferably, the average composite roughness height within an individual calibration band is substantially uniform, and the average composite roughness height of each calibration band is slightly different from that of the other calibration bands.

42 Claims, 10 Drawing Sheets

CALIBRATION DISK HAVING DISCRETE BANDS OF COMPOSITE ROUGHNESS

CROSS-REFERENCES TO RELATED APPLICATIONS

This application is a continuation-in-part of patent application Ser. No. 09/164,208, entitled "CALIBRATION DISK HAVING DISCRETE BANDS OF CALIBRATION BUMPS," filed Sep. 30, 1998, now U.S. Pat. No. 6,164,118 and having S. Suzuki, D. M. Shiraki, J. P. Patel, D. Frusescu, D. Treves and T. H. Hua as inventors. This application is assigned to Komag, Inc., the assignee of the present invention, and is hereby incorporated herein by reference.

BACKGROUND OF THE INVENTION

1. Field of the Invention

The present invention relates to a calibration disk that can be used for calibrating a glide head, used in the process of manufacturing hard memory disks.

2. Description of the Related Art

The key components of a hard disk drive are a magnetic disk and a magnetic head, which is typically separated from the magnetic disk by a small gap. The gap is created by the magnetic head remaining relatively stationary while the magnetic disk rotates on a spindle. The rotation of the magnetic disk generates a thin film of air known as an "air bearing" over the surface of the disk that supports the magnetic head, which is essentially flying over the surface of the magnetic disk.

The permitted recording density of the magnetic disk is strongly influenced by the gap or "fly height" between the disk and the magnetic head. Because decreasing the fly height of the magnetic head allows the recording density of the magnetic disk to be increased, the magnetic disk should have a very smooth surface so the magnetic head can fly very close to the surface. Magnetic disks with protrusions related to defects or contamination that exceed the fly height of the magnetic head should not be used in production hard disk drives. This is because an impact between the magnetic head and a protrusion can cause undesirable effects, such as a hard drive crash, formation of wear debris, unusable recording area, a thermal spike in a magnetoresistive head and the like. In order to ensure acceptable surface conditions of the magnetic disk, glide tests are widely employed by the hard disk industry for purposes of quality control.

The basic operation of the glide test is to fly a test head, i.e., a glide head, at a height related to the fly height and margin requirements of the magnetic head, and to sense any contact between the glide head and any defects on the surface of the magnetic disk. If the glide head contacts a defect, the disk is rejected. The term "glide head" as used herein indicates a head used in a magnetic disk testing system, as distinguished from the term "magnetic head," which is used in general to refer to a read-write head.

The contact detection is typically accomplished with a piezoelectric (PZT) sensor or an acoustic emission (AE) sensor. The PZT sensor, as is well known to those skilled in the art, uses a piezoelectric crystal to convert mechanical energy into an electrical signal. Thus, a PZT sensor converts the mechanical energy generated by the glide head contacting a defect into an electrical signal that can be used to indicate the size and location of the defect.

An AE sensor uses a sensing technique similar to a PZT sensor. The difference is the mounting position and configuration of the sensor. The sensing material in an AE sensor is typically a PZT ($PbZrO_3$–$PbTiO_3$) ceramic that has a piezoelectric effect and which is housed in a metal container and mounted close to the head/slider suspension. Both the PZT and AE sensors give electrical signals excited by acoustic vibration. For more information related to the aforementioned sensing technology see U.S. Pat. Nos. 5,423,207 and 4,532,802.

The magnetic disk can also be tested for defects using non-contact methods such as a magneto-resistive (MR) head, a laser, or an optical tester. For more information related to MR technology see U.S. Pat. No. 5,527,110, and see U.S. Pat. No 5,550,696 for a method to calculate a protrusion height based on a diffracted laser beam detected by a linear photo-detector array. An optical tester optically scans the magnetic disk for defects. The detection is usually performed by comparing the light reflected from a defect with the light reflected from an area of the disk that does not have defects. The optical tester is calibrated in such a way that a rejection of a magnetic disk occurs when the height of a defect is above a desired threshold.

Another important parameter of the magnetic disk is the minimum height at which a head can fly without contacting the disk surface, known as the avalanche height, which occurs at the avalanche point on an avalanche curve (described subsequently). It will be noted that the avalanche height can differ from the fly height of the glide head. While the fly height is usually determined by potential extrinsic defects, such as contamination, the avalanche height is determined by intrinsic surface topology. The avalanche height is defined as the fly height at which the lowest part of the head starts to contact the disk surface. For example, the landing zone of a magnetic disk, which is usually heavily textured to prevent excessive friction, has a relatively large avalanche height due to the additional surface roughness created by the heavy texturing. The data zone, however, has a smoother surface because there is no need to reduce friction. Consequently, a glide head can fly lower over the data zone than the landing zone, and thus, the data zone has a relatively lower avalanche height. The avalanche height is a useful indication of the surface finish and gives an absolute fly height below which flying is not possible without contacting the disk.

While magnetic disks are ideally flat and smooth, in practice there is typically an amount of disk waviness and runout. Disk waviness causes the effective height of a disk's surface to vary relative to the mean disk surface. If the waviness of the disk surface has a wavelength that is less than a longitudinal dimension of the glide head, the glide head cannot follow the disk surface. Consequently, the amplitude of the waviness needs to be accounted for when determining fly height. A typical amplitude of the waviness of a disk is 20 to 60 nm (nanometers) and has a wavelength that is typically smaller than the length of a conventional glide head.

Disk runout is a deviation from a level surface and is caused by improper clamping of the disk, for example. The runout effect typically creates a variation from a level surface over an area of the disk that is much greater than the length of the glide head. Disk runout causes acceleration of the glide head which induces fly height fluctuations. A typical disk runout is approximately 2 to 10 μm (micrometers).

To accurately test a magnetic disk with a glide head, it is important for the glide head to be calibrated so that the fly height at which the test is carried out is known. Calibration ensures that the threshold for defects is set to an appropriate limit (i.e., the height above which a surface defect becomes unacceptable). A conventional method of calibration is performed by flying a glide head over a glass disk on a fly height tester. The fly height tester operates by passing a beam of light through the glass disk. The interference pattern of light reflected off the glide head and light reflected off the surface of the glass disk is used to determine the distance between the disk surface and the glide head. This procedure is performed for a number of different linear velocities of the glass disk to establish the relationship between linear velocity and fly height for that particular glide head.

The linear velocity versus fly height relationship is then used to determine the linear velocity at which to fly the glide head over production disks on a glide tester. Thus, a linear velocity can be selected that achieves the desired glide height, in order to test for defects on a production disk that are higher than the glide height. This procedure is performed for each individual glide head because each glide head has different flying characteristics.

There are several drawbacks to the use of a fly height tester for calibration of a glide head. For example, the fly height tester uses a glass disk, which may have different characteristics than a production memory disk, including differences in waviness, runout and the like. Changes in surface topology will cause a change in the flying characteristics of the glide head and, thus, the fly height of the glide head may be different when the glide head flies over a production disk. The difference in waviness and runout between a glass disk and a production magnetic disk can also affect calibration accuracy.

In addition, the fly height tester measures the fly height of the glide head at a limited number of points, i.e., only at the points where the light is incident on the glide head. Because the attitude of a glide head in flight is not flat (i.e., the leading edge of the glide head is flying higher than the trailing edge), portions of the glide head may actually be lower than the points on the glide head being illuminated. Thus, the actual fly height of the lowest point on the glide head may be lower than the measured fly height.

Further problems encountered with using a fly height tester for calibration arise from the fact that the glide head is first installed on the fly height tester to determine fly height. The glide head is then removed from the fly height tester and installed on the glide tester to test production disks. Installing the glide head on two separate systems is time consuming and thus results in a loss of productivity. In addition, the glide head may be installed slightly differently on the glide tester than on the fly height tester. Differences in the installation on the two devices can cause differences in the flying characteristics of the glide head, including skew and mount flatness, thereby resulting in an inaccurate calibration of the glide head. Moreover, the Z height, which is the height between the disk surface and the suspension arm upon which the glide head is mounted, may differ between the fly height tester and the glide tester. Variances in Z height can also adversely affect the repeatability of the flying characteristics of the glide head from the fly height tester to the glide tester.

SUMMARY OF THE INVENTION

In accordance with the present invention, a calibration disk includes calibration areas that allow a glide head to be calibrated as to the glide head's avalanche height, fly height and the like. The calibration areas may be, for example, configured in a circumferential band (or, alternatively, a series of circumferential bands extending substantially concentric to one another), one or more spiral bands or some other suitable configuration. Such bands can, for example, extend from adjacent an outer diameter of the calibration disk to adjacent an inner portion of the calibration disk, and are typically circular in shape (and are therefore also referred to herein as circular bands). Each of the circumferential bands is a textured area on the calibration disk having a given degree of composite roughness, which can be measured, for example, by the given circumferential band's average composite roughness height, and as such is referred to herein as a calibration band. This texturing can be by mechanical zone texturing, laser zone texturing or any other method that produces the desired composite roughness. Preferably, the given calibration band is textured in a uniform manner, sufficient to produce a constant and continuous output signal from a sensor mounted on a glide head when the glide head flies at an avalanche height. Also preferably, the average composite roughness height within an individual calibration band is substantially uniform, and the average composite roughness height of each calibration band is differs from that of the other calibration bands. As used herein the term "calibration bands" is not to be confused with data tracks typically found on a production read-write magnetic hard disk.

The calibration disk can be, for example, double-sided, with calibration bands on both sides of the disk. Further, such a calibration disk can be constructed, for example, from a material such as nickel-phosphorus-plated aluminum, and can also have magnetizable layers on its surface. The calibration bands can be produced using, for example, mechanical zone texturing or laser zone texturing in a concentric or spiral pattern, or in any other appropriate manner. Average composite roughness height is determined by measuring composite roughness height at various points in a calibration band and then using the statistical formulae described herein to arrive at an estimation of the average composite roughness height for a given area on the calibration disk in question. In addition, such a technique compensates for the waviness and runout effects of a disk as well as variations of fly height of glide heads.

A calibration disk according to the present invention can be used to check the actual flying conditions of a glide head while the glide head is mounted on a glide tester system, thereby obviating the need to independently test the fly height of the glide head on a fly height tester. Consequently, productivity loss and other problems associated with a fly height tester, such as variance in the glide head's flight characteristics due to remounting the glide head on the glide tester, are avoided.

In one embodiment, a calibration disk for calibrating a head is described. The calibration disk includes a calibration area created by texturing and having a given composite roughness. This composite roughness can be created, for example, by mechanical zone texturing or laser zone texturing. The calibration area can be, for example, in the form of a circumferential band. The width of such a circumferential band is preferably greater than a width of the head. The circumferential band can be one of a number of such circumferential bands extending substantially concentric to one another, where each of the circumferential bands has a composite roughness. The composite roughness can be described in terms of a given micro-waviness and a given roughness. The maximum wavelength of the micro-waviness can be defined as less than about a length of said head, while a minimum wavelength of said micro-waviness can be defined as being greater than about a feature size of said roughness. The composite roughness can be described, for example, in terms of composite roughness height or average composite roughness height.

In another embodiment, a method of calibrating a glide head with a calibration disk is described. The method begins with providing a calibration disk having a calibration area. The calibration area exhibits a composite roughness, which can be described, for example, in terms of composite roughness height or average composite roughness height. Next, a glide head is flown over the calibration area. While flying the glide head over the calibration area, a substantially constant signal indicative of contact between said glide head and said calibration area is detected. A recorded linear velocity at which said signal is detected is recorded, and a test linear velocity based upon said recorded linear velocity is determined.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

In addition, the following detailed description has been divided into sections, subsections, and so on, in order to highlight the various subsystems of the invention described herein; however, those skilled in the art will appreciate that such sections are merely for illustrative focus, and that the invention herein disclosed typically draws its support from multiple sections. Consequently, it is to be understood that the division of the detailed description into separate sections is merely done as an aid to understanding and is in no way intended to be limiting. A number of the terms used herein are defined in a glossary at the end of the specification. Whenever used herein, the terms thus defined shall have the meanings set forth in the glossary.

INTRODUCTION

Embodiments of the present invention permit the determination of a glide head's fly height as a function of the instantaneous linear velocity of the disk through the use of a calibration disk having one or more bands of varying degrees of composite roughness. These varying degrees of composite roughness can be described, for example, in terms of composite roughness height or average composite roughness height. Calibration of a glide head thus allows one to accurately estimate the glide head's fly height for a given linear velocity. Once calibrated, the glide head may then be used to perform quality control checks on production samples of magnetic disks. Using these techniques, such measurements can be made at reduced fly heights (as compared to those employed in existing methods). Such reduced fly heights are made possible by the substantially smaller variations in surface height exhibited by composite roughness.

Historically, fly heights down to about 1.0 $\mu"$ (microinches) have been employed. However, fly heights have recently decreased to about 0.8 $\mu"$ as part of the effort to increase disk's storage density. In the future, it is expected that fly heights will drop to about 0.6 $\mu"$, with further reductions possible (if not probable), as the need for increased disk capacity continues. Composite roughness heights exhibited by calibration bands created using a process according to the present invention exhibit a minimum composite roughness height of about 2 Å (angstroms), which allows calibration of fly height down to less than about 0.25 $\mu"$. As fly heights continue to decrease, the use of composite roughness for performing quality control analysis of magnetic disks will become increasingly important.

A CONFIGURATION FOR MEASURING FLY HEIGHT

Figure 1A:
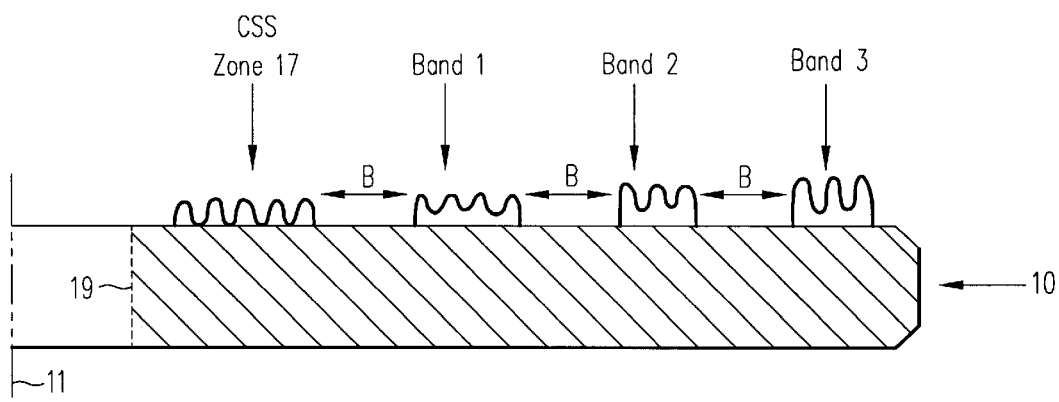
FIG. 1A is a schematic cross-sectional half view of a calibration disk with a wide CSS zone three calibration bands.
Figure 1B:
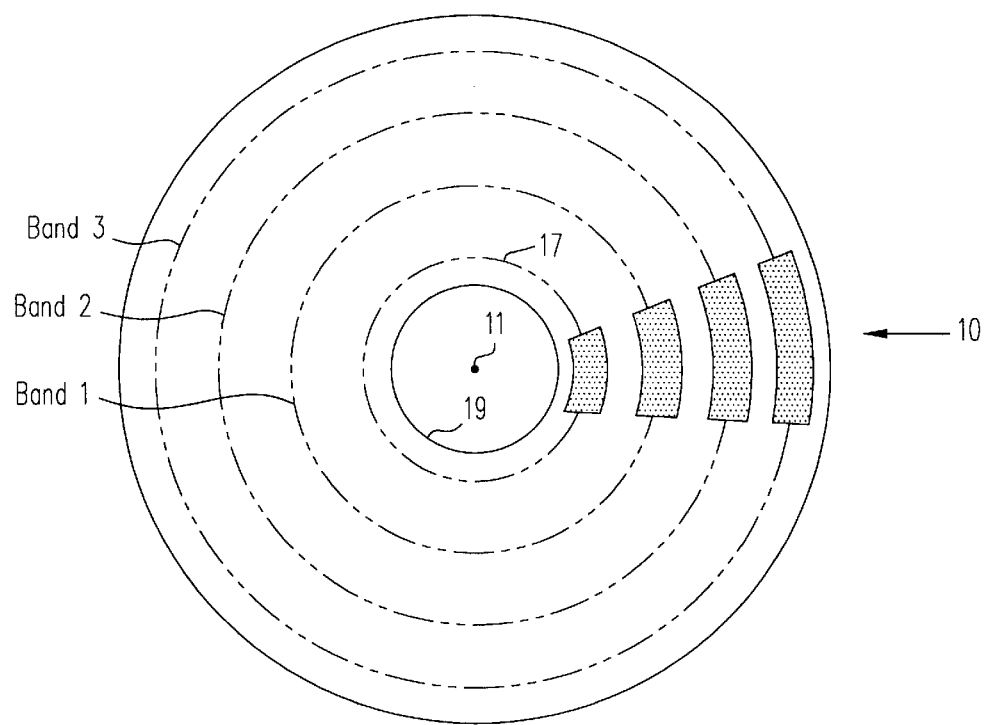
FIG. 1B is a plan view of the calibration disk from FIG. 1A.

FIGS. 1A and 1B show a schematic cross-sectional half view and a plan view, respectively, of a calibration disk 10 about disk center line 11. Calibration disk 10 has a central aperture forming an inside diameter 19, three distinctive circumferential bands 1, 2, and 3, as well as one Contact Start and Stop (CSS) zone 17 for head load/unload, as shown in FIG. 1A. Bands 1, 2, and 3, as well as the CSS zone 17, are areas of calibration disk 10 that have been textured to a certain degree. This texturing can be accomplished by, for example, mechanical zone texturing, laser zone texturing or any other method or processing capable of creating the desired composite roughness. Such texturing techniques are typically used to create CSS zones such as CSS zone 17, for example, and so are well known to those of skill in the art. For more information related to mechanical zone texturing see U.S. Pat. No. 5,820,446. For more information related to laser zone texturing see U.S. Pat. No. 5,100,781. Such texturing techniques can be used to create what is referred to herein as composite roughness, which is described in detail subsequently. The composite roughness in an individual band exhibits approximately uniform height, while the height of such composite roughness differs from one band to the next, as shown in FIG. 1A. The CSS zone is used as a load/unload zone for a glide head if contact start and stop is needed.

Although only one side of calibration disk 10 is depicted in FIG. 1A as being textured, one of ordinary skill in the art will understand that calibration bands can be created on both sides of calibration disk 10 and thus calibration disk 10 can be used for calibration on both sides at the same time. Moreover, it should be understood that three calibration bands are shown for illustrative purposes, and that additional or fewer bands may be used as desired.

Calibration bands such as calibration bands 1, 2, and 3 are preferably created by performing the requisite texturing in substantially circular bands, as depicted in FIGS. 1A and 1B. It will be noted that the distance B between calibration bands 1, 2, and 3, as well as the distance from the CSS zone 17 to calibration band 1, is preferably wider than the width of the glide head (FIG. 2) to ensure a single contact condition per calibration band (i.e., to avoid a situation in which the glide head contacts two calibration bands simultaneously). Thus, calibration bands 1, 2, and 3 are depicted as discrete bands. It will also be noted that, while only a portion of the texturing performed on calibration disk 10 is shown in FIG. 1B, calibration bands 1, 2 and 3 are concentric to one another and extend around the entire circumference of the disk. In fact, the texturing in each band can be circular or in an essentially cylindrical spiral, or in some other desirable configuration, as will be understood by those of skill in the art.

Moreover, the surface of calibration disk 10 between the calibration bands would not be expected to be perfectly smooth. The surface topology of the areas between the calibration bands can thus cause signal noise during calibration performed using calibration disk 10. However, such noise can be ignored and therefore would not be expected to affect calibration. Consequently, although calibration bands 1, 2 and 3 are depicted in FIGS. 1A and 1B as discrete bands separated by a perfectly smooth disk surface, such may not necessarily be the case for an actual calibration disk. Calibration disk 10 is thus an idealized representation of an actual calibration disk.

Calibration bands 1, 2, and 3 can be created, for example, using mechanical zone texturing techniques, which are well understood by those of ordinary skill in the art. Texturing can also be produced using other techniques, such as a laser zone texturing technique, which is also well known to those of ordinary skill in the art. After texturing, the disk can be processed using the same manufacturing processes used for a typical production magnetic disk, e.g. by the addition of magnetizable material on the data-receiving surface(s). Of course, it should be understood that the specific order of processing steps is not critical to the present invention, and therefore texturing can be performed at the end of the processing steps if desired. Consequently, calibration disk 10 closely approximates the surface conditions that are found on a typical production magnetic disk (e.g., lubrication), with the addition of a number of calibration bands.

Figure 2:
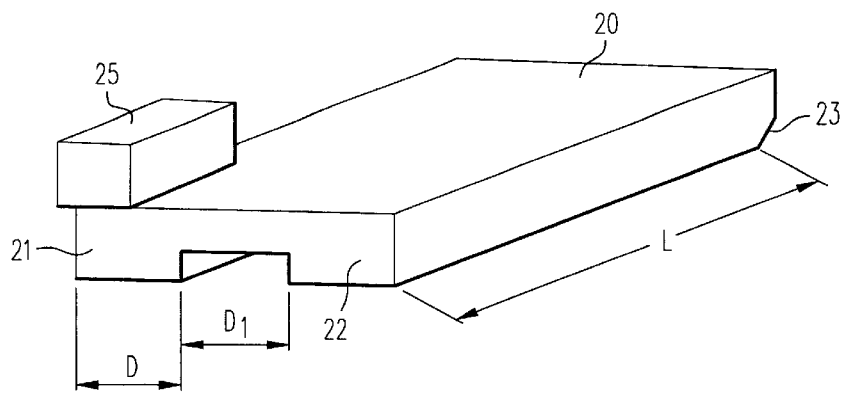
FIG. 2 is a perspective view of a typical glide head with a PZT crystal sensor for contact detection.

FIG. 2 shows a perspective view of a typical glide head 20 with two rails 21, 22, each having a width D and length L. Rails 21, 22 are separated by a distance $D_1$. Rails 21, 22 of glide head 20 are typically flat and tapered at the leading end 23. However, various kinds of glide head designs can be utilized in conjunction with calibration disk 10 as long as the glide head is designed to form an air bearing. Glide head 20 includes a contact detection sensor 25, such as a PZT sensor, and is mounted on a suspension arm (not shown). The glide head flexes when contact is made with an asperity on the disk surface, causing the PZT sensor to experience mechanical stress. In response, the PZT sensor emits a signal. An example of a suitable glide head for calibration with calibration disk 10 is a 50% size glide head with a Type II suspension, a gram load of 9.5 grams, and with a compressive PZT sensor available from Glide/Write, Inc. of San Jose, Calif. A typical 50% size glide head has a length L of rails 21, 22 of approximately 2 mm and a width D of the individual rails of approximately 200 μm. Also, an AE sensor such Model No. S9225 available from Physical Acoustics Corp. of Princeton, N.J. can be used as sensor 25. Of course, other types of sensors can be used in conjunction with the glide head being calibrated, including a magnetic-resistive sensor, a thermal asperity sensor, a photo-detector array sensor and the like. Calibration of non-contact testers can be conducted by registering the signal level output by the sensing device as a function of the known average composite roughness height on calibration disk 10. The level of the output signal can then be used to estimate the height of an unknown object on a production disk.

Figure 3:
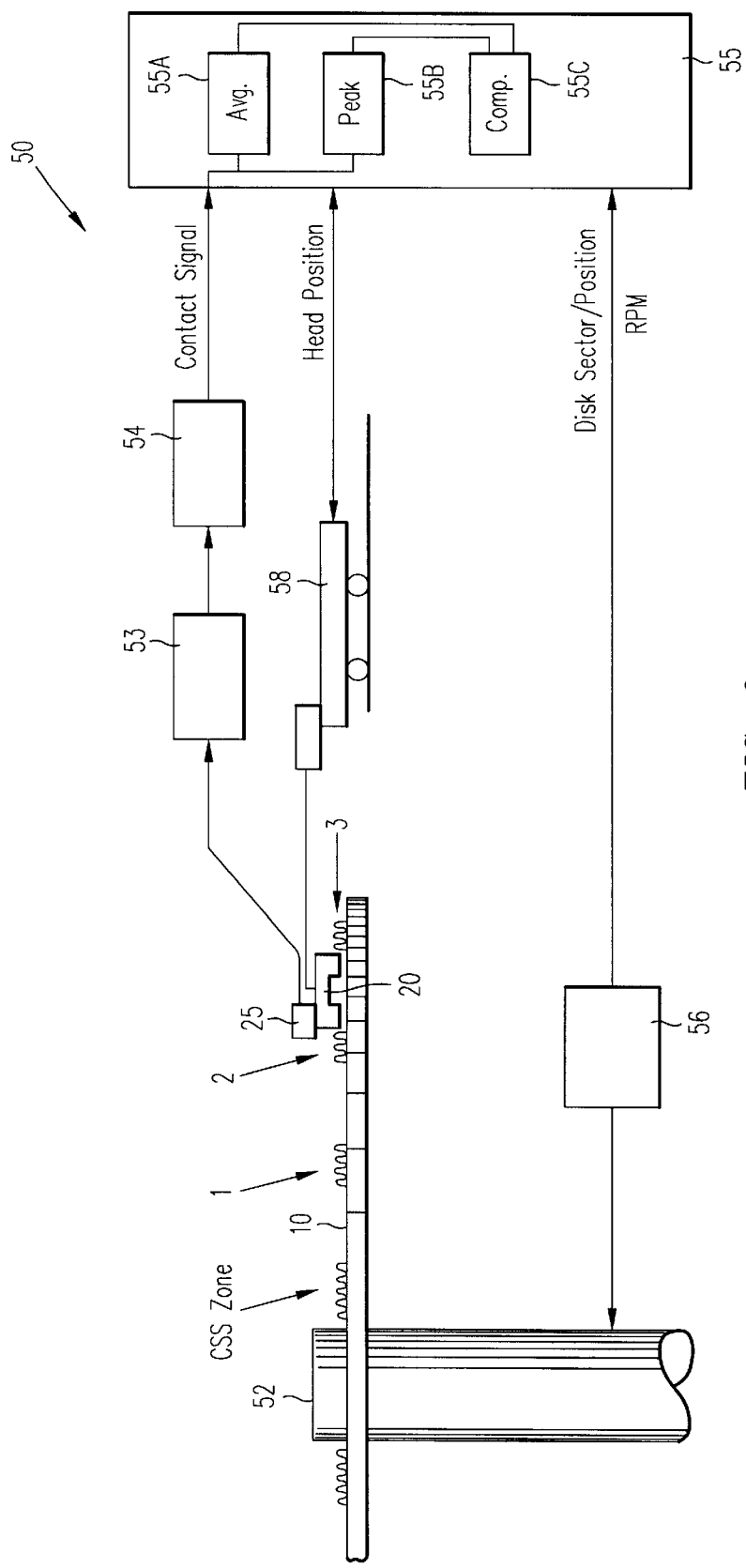
FIG. 3 is a schematic view of a glide tester system.

FIG. 3 illustrates a schematic view of a glide tester 50 that uses calibration disk 10. Glide tester 50 can be, by way of an example, a model MG250 glide tester manufactured by Phasemetrics, Inc. located in Fremont, Calif. Calibration disk 10 is mounted on a disk drive spindle 52. Glide head 20 flies (i.e., is positioned) over various ones of bands 1, 2, and 3 by the operation of an actuator 58 controlled by a controller 55. PZT sensor 25 is connected to a PZT amplifier 53, which is in turn connected to a data acquisition module 54 for transferring the signal from PZT sensor 25 to controller 55. The signal generated by PZT sensor 25 is an analog signal that is processed by average circuitry 55A and peak circuitry 55B to determine the respective average level and peak level of the signal generated by PZT sensor 25. The average level is then compared with the peak level at a comparator circuitry 55C to determine whether glide head 20 has made contact with the surface of calibration disk 10. The average level can be determined through a root mean square (RMS) analysis or any other appropriate manner.

The position of actuator 58 is input into controller 55. An index/position sensor 56 senses the position of glide head 20 relative to calibration disk 10 and inputs that position along with the rotational speed of the calibration disk to controller 55. From this information, the linear velocity of glide head 20 relative to calibration disk 10 can be determined. Controller 55 produces an output signal that corresponds to the signal generated by PZT sensor 25 and the location of glide head 20 over calibration disk 10. It will be noted that, during testing and calibration, it is desirable to avoid contaminants on glide head 20. One method of removing contaminants from glide head 20 is to perform a contact start and stop (CSS). For this purpose, a textured disk surface, such as CSS zone 17 of calibration disk 10, is effective.

Calibration disk 10 can be used in conjunction with a fly height tester to accurately calibrate a glide head. The glide head is flown over a band on the calibration disk to obtain an avalanche curve. As described subsequently, an avalanche curve is a plot of the output signal generated by PZT sensor 25 (e.g., in volts) versus disk speed (e.g., in inches per second (IPS)). From the avalanche curve, the linear velocity at which contact with the surface of calibration disk 10 first occurs can be determined. It should be understood that the actual magnetic heads can be similarly calibrated with calibration disk 10 so as to determine the actual fly height of the magnetic heads.

Figure 4:
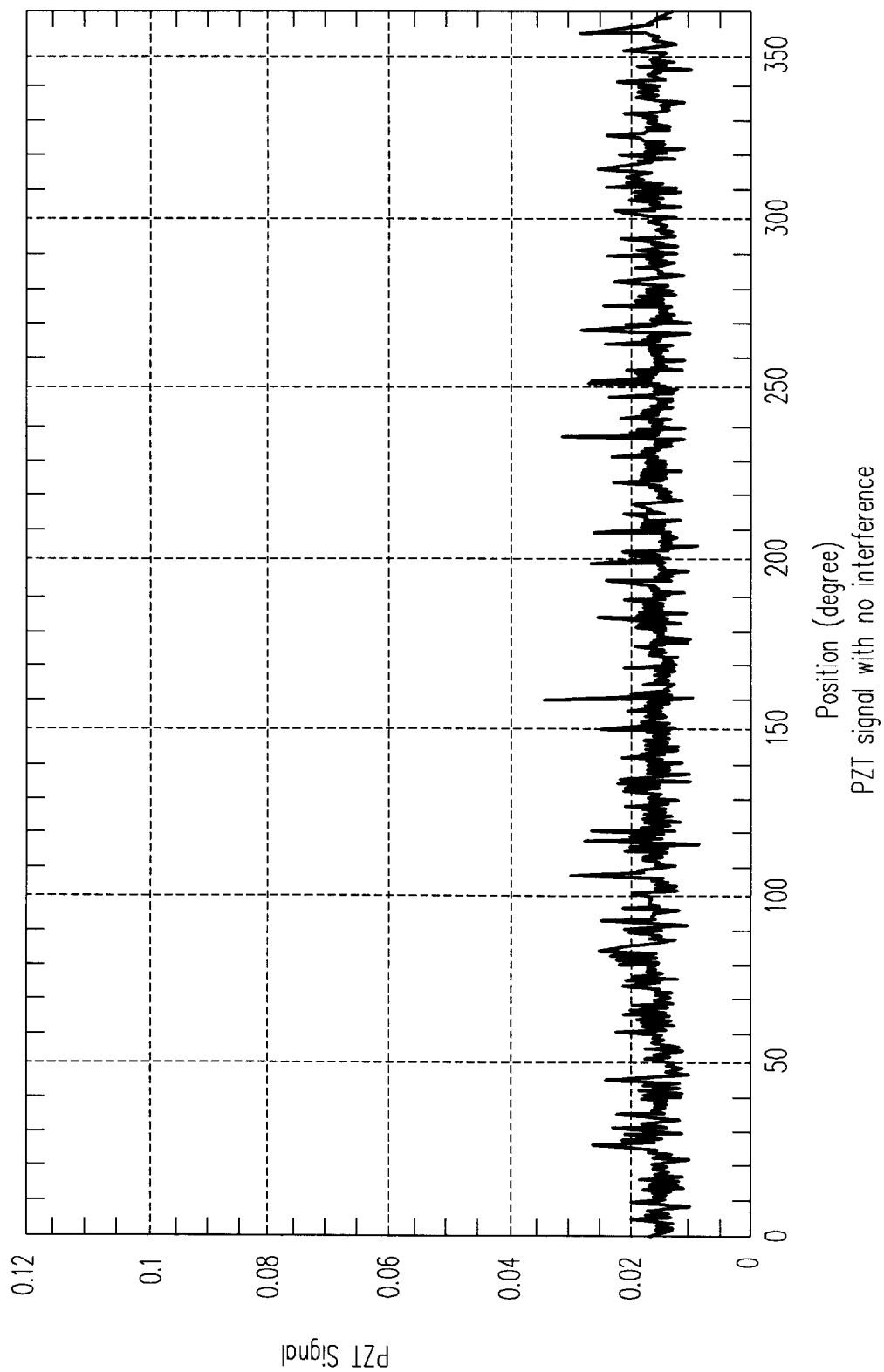
FIG. 4 illustrates PZT output signals over one revolution of a calibration disk showing no interference.

FIG. 4 illustrates a signal generated by a PZT sensor for the case of a glide head that is flying above an avalanche height for a given calibration band. It will be noted that the glide head used to generate the graph shown in FIG. 4 has a length L of 2 mm. As shown in FIG. 4, when the glide head is flying over the calibration band at a fly height greater than that calibration band's avalanche height, no contact is made with the given calibration band, and therefore signals indicating contact do not result. As the fly height of the glide head is decreased below the avalanche height for the given calibration band, such contact appears as an increase in the noise observed in the signal generated by the PZT sensor. This noise increases in a relatively constant fashion, as the fly height is reduced. At any one fly height, the noise level in the signal is normally expected to remain relatively constant, indicating that the disk is free of topological irregularities (e.g., defects, contaminants and the like). Consequently, the level of noise in the signal can be used to identify disks having topological irregularities.

Figure 5:
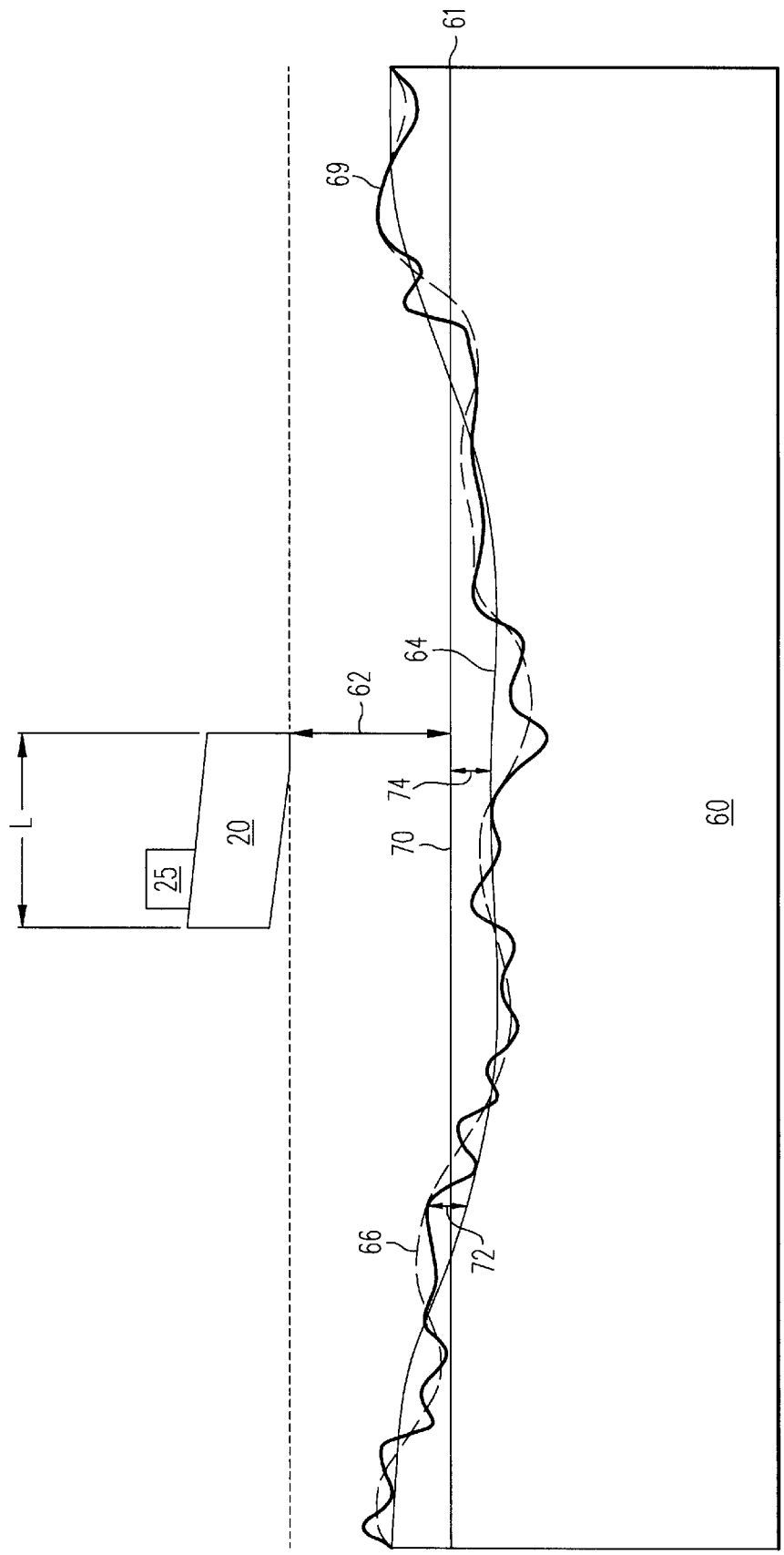
FIG. 5 is a side view of a disk's surface.

FIG. 5 is a side view of a calibration disk 60 illustrating the surface of a calibration band 61 thereon. To determine the fly height of a glide head (depicted in FIG. 5 as a fly height 62), it is necessary to consider the waviness (depicted in FIG. 5 as a waviness 64), micro-waviness (depicted in FIG. 5 as a micro-waviness 66) and roughness (depicted in FIG. 5 as a roughness 68) of the surface of calibration disk 60 (depicted in FIG. as a disk surface 69). As shown in FIG. 5, because of the topology of disk surface 69, disk surface 69 may deviate substantially from the mean surface height of disk surface 69 (depicted in FIG. 5 as a mean surface height 70). These variations can be characterized by the combination of waviness 64, micro-waviness 66 and roughness 68. These characteristics are now described in detail.

Waviness in the surface of a calibration disk (e.g., calibration disk 60) is simply gentle variations in the height of disk surface 69 with respect to mean surface height 70, as shown in FIG. 5. The surface defined by waviness 64 deviates from mean surface height 70 by a height variation 74. Given that such variations are relatively gentle, a glide head would be expected to be able to follow the contours thereof. In fact, waviness can be defined, in the alternative, as variations in the height of disk surface 69 that the given glide head is capable of following under the given testing conditions (e.g., disk speed, glide head flight characteristics and the like).

Micro-waviness is defined herein as waviness having a wavelength within a particular range, as defined by a minimum wavelength and a maximum wavelength. The minimum wavelength of micro-waviness 66 can be defined as being approximately equal to the maximum feature size of roughness 68 (defined subsequently). The maximum wavelength of micro-waviness, for the sake of simplicity, can be defined as being approximately less than the length of the glide head employed (e.g., 2 mm for glide head 20). Using such a definition, then, the maximum wavelength defining micro-waviness is dependent on the dimensions of the glide head employed. This is intuitively correct because a glide head would be expected to be able to follow, at least in some circumstances, features having wavelengths longer than the glide head's length. Conversely, the glide head would not be expected to follow features shorter than the glide head. For example, assuming a micro-waviness having the idealized shape of a sinusoid with a wavelength of 1 mm, and a glide head length of 2 mm, the glide head would tend to rest on the peaks of the sinusoid, and so would be unable to follow the contours of such a surface. Thus, micro-waviness can be defined as waviness having a maximum wavelength approximately equal to the length of the glide head employed (e.g., 2 mm for glide head 20).

More broadly, micro-waviness can be alternately defined as having a wavelength that causes the glide head to come into contact the surface of the calibration disk. This is in contrast to waviness, the definition of which assumes that the glide head will not come into contact with the surface of the calibration disk. It will be noted that this limit is affected by the test's parameters (e.g., disk speed, glide head flight characteristics and the like). In this case, glide head 20 is unable to follow the surface defined by micro-waviness 66, and so comes into contact with the surface at one or more points. For example, for a given linear velocity, there will be wavelengths of micro-waviness 66 that, although longer than the length L of glide head 20, nonetheless cause glide head 20 to come into contact with disk surface 69. This results in micro-waviness 66 having a maximum wavelength that is greater than the length L of glide head 20. While potentially more difficult to quantify than the length L, such a measure gives a broader, and potentially more accurate definition of the term. In order to simplify the present discussion, however, the length L of the glide head will be used to define the maximum wavelength of micro-waviness 66. It will be noted that the combination of waviness and micro-waviness is referred to herein as disk waviness.

Roughness is defined herein as variations in surface height that have feature sizes of less than a maximum feature size, defined herein as being about 200 microns ($\mu$m). The term feature size is used herein to describe the distance between points on disk surface 69 that delineate a feature (e.g., a peak or valley in disk surface 69). For example, a feature size can be viewed as the distance between a first peak and a second peak in disk surface 69 that is less than the maximum feature size. The term feature size is used, rather than wavelength, when discussing roughness because roughness may lack the gentle variation associated with waviness and microwaviness, being instead random and a periodic in nature. Roughness is measured in Å.

Composite roughness, as defied herein, is the combination of micro-waviness 66 and roughness 68, which varies from the surface defined by waviness 64 at any one point by a composite roughness height 74. It will be apparent to one of skill in the art that composite roughness can- be comprised solely of micro-waviness (as where roughness is negligible (or nonexistent)) or roughness (as where micro-waviness is negligible (or nonexistent)). Composite roughness height 74 is the deviation of disk surface 69 from waviness 64. As will be apparent to one of skill in the art, composite roughness height can be measured from other points of reference, such as the given disk's mean surface height, the opposite side of the disk, or some other convenient point of reference. The average of a number of composite roughness heights measured at various points on a given calibration band is referred to herein as an average composite roughness height (not shown). An acceptable measure of the average composite roughness height can be determined, for example, using the statistical methods described subsequently. The combination of composite roughness height 72 and height variation 74 at a given point is the deviation of disk surface 69 from mean surface height 70. The maximum composite roughness height is equal to the avalanche height, when the glide head begins to make contact with disk surface 69.

For calibration purposes, the degree of composite roughness of each calibration band (e.g., as measured by average composite roughness height) should be sufficient to produce a relatively constant output signal when the glide head flies lower than the calibration band's maximum composite roughness height (i.e., avalanche height). As noted, the height of a given calibration band's surface at a given point is referred to herein as the composite roughness height at that point, while an average composite roughness height may be determined by using statistical techniques, for example.

Waviness, microwaviness and roughness can also be viewed in terms of wavelength (and so frequency), to a certain extent. Waviness exhibits relatively long wavelengths (relatively low frequency) that is relatively easy for a glide head to follow. Micro-waviness, as its name implies, exhibits a relatively shorter wavelength (relatively higher frequency), which is more difficult for the glide head to follow. At the extreme, roughness exhibits a "wavelength" (referred to herein as feature size) that is shorter (i.e., with a relatively high frequency) and even more difficult for the glide head to follow. As noted, roughness cannot really be said to have a wavelength (or frequency) due to its random and a periodic nature.

Figure 6:
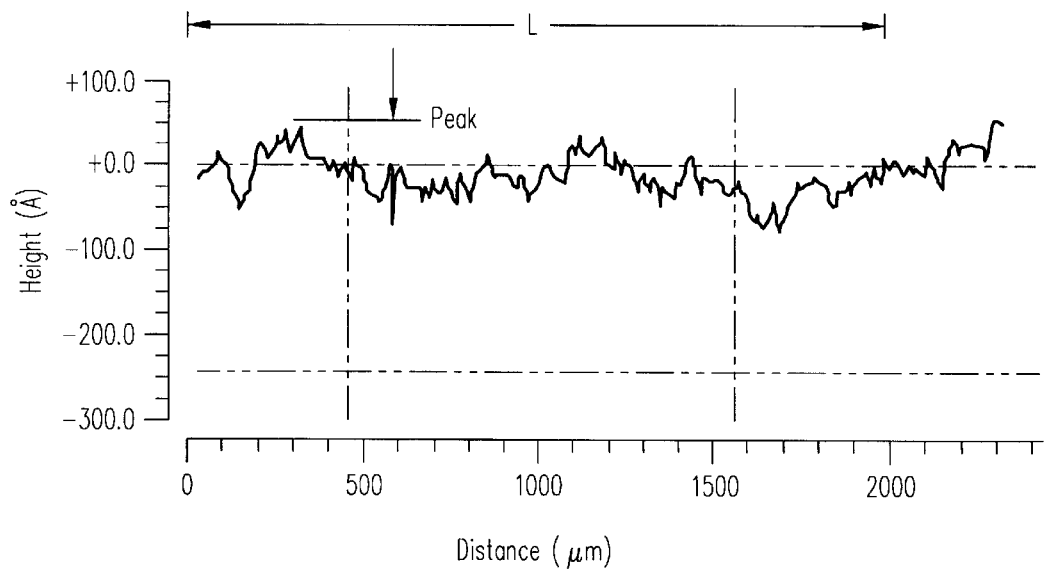
FIG. 6 is a graph showing composite roughness of a typical disk.

FIG. 6 is a graph illustrating the composite roughness of a disk's surface.

Within a distance approximately equal to the length L of a glide head (here, 2 mm), the disk surface measured in the test depicted in FIG. 6 deviates up to about 60 Å from the waviness over which the glide head flies (e.g., the surface defined by waviness 64) as indicated by the surface height plotted therein. As can be seen, the wavelength of the micro-waviness is approximately 1 mm, about half the glide head's length. Also visible is the given surface's roughness, which is fairly random and a periodic, as noted. The roughness depicted therein is defined as having a maximum feature size of about 200 $\mu$m. The plot depicted in FIG. 6 thus illustrates both micro-waviness (having a maximum wavelength of approximately equal to or less than length L), as well as roughness (the smaller features that are visible therein).

Figure 7:
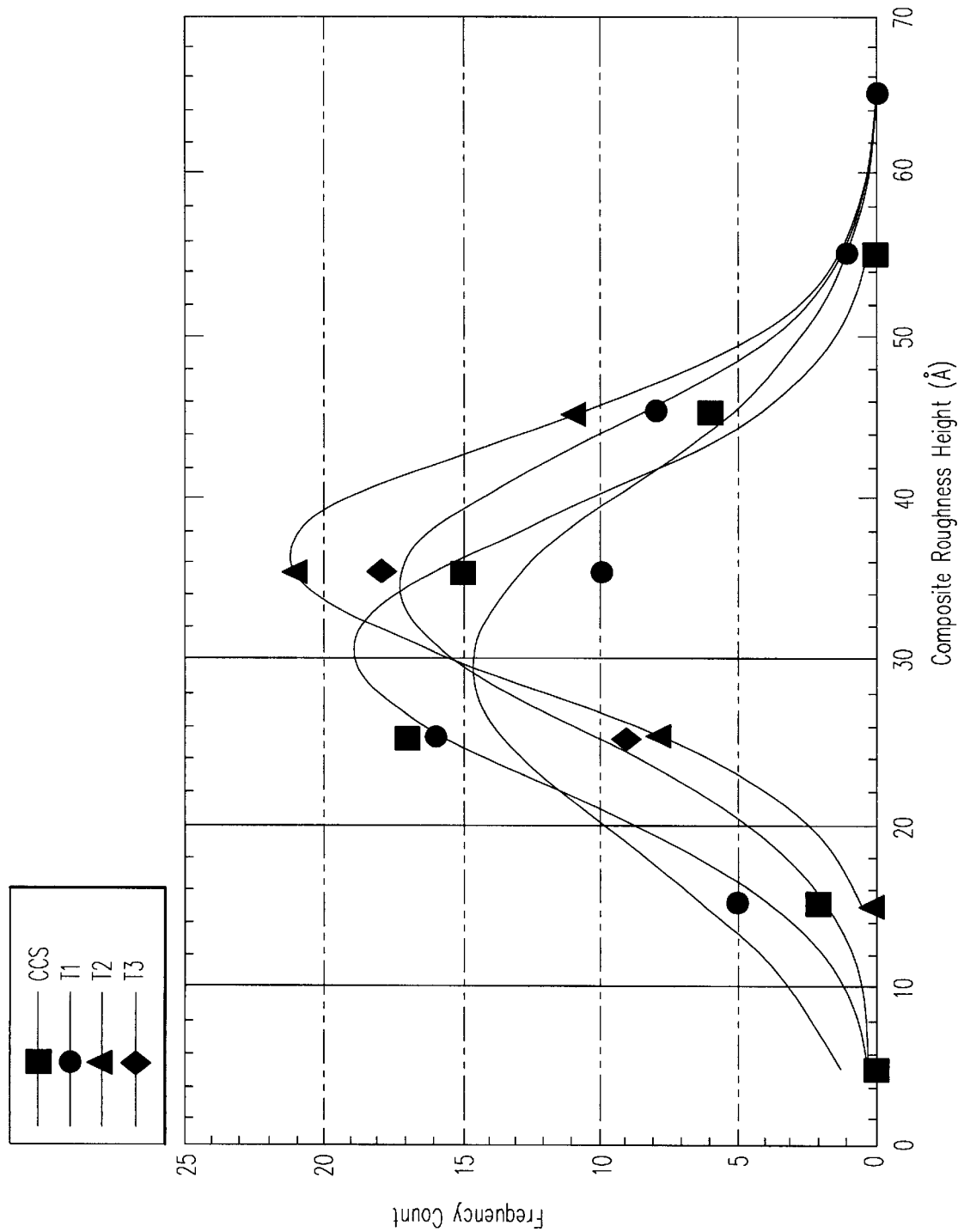
FIG. 7 is a graph of surface characteristics of a calibration disk.

FIG. 7 shows distributions of composite roughness heights on three bands and the CSS zone of a calibration disk. The Y axis of the graph in FIG. 7 is frequency count (the number of peaks having a given composite roughness height), which is the number of measurements showing a particular composite roughness height (represented by the X axis). It will be noted that composite roughness height is an instantaneous value and is normally measured at peaks in the disk's surface, while average composite roughness height is an average value determined from multiple composite roughness height measurements.

Figure 8:
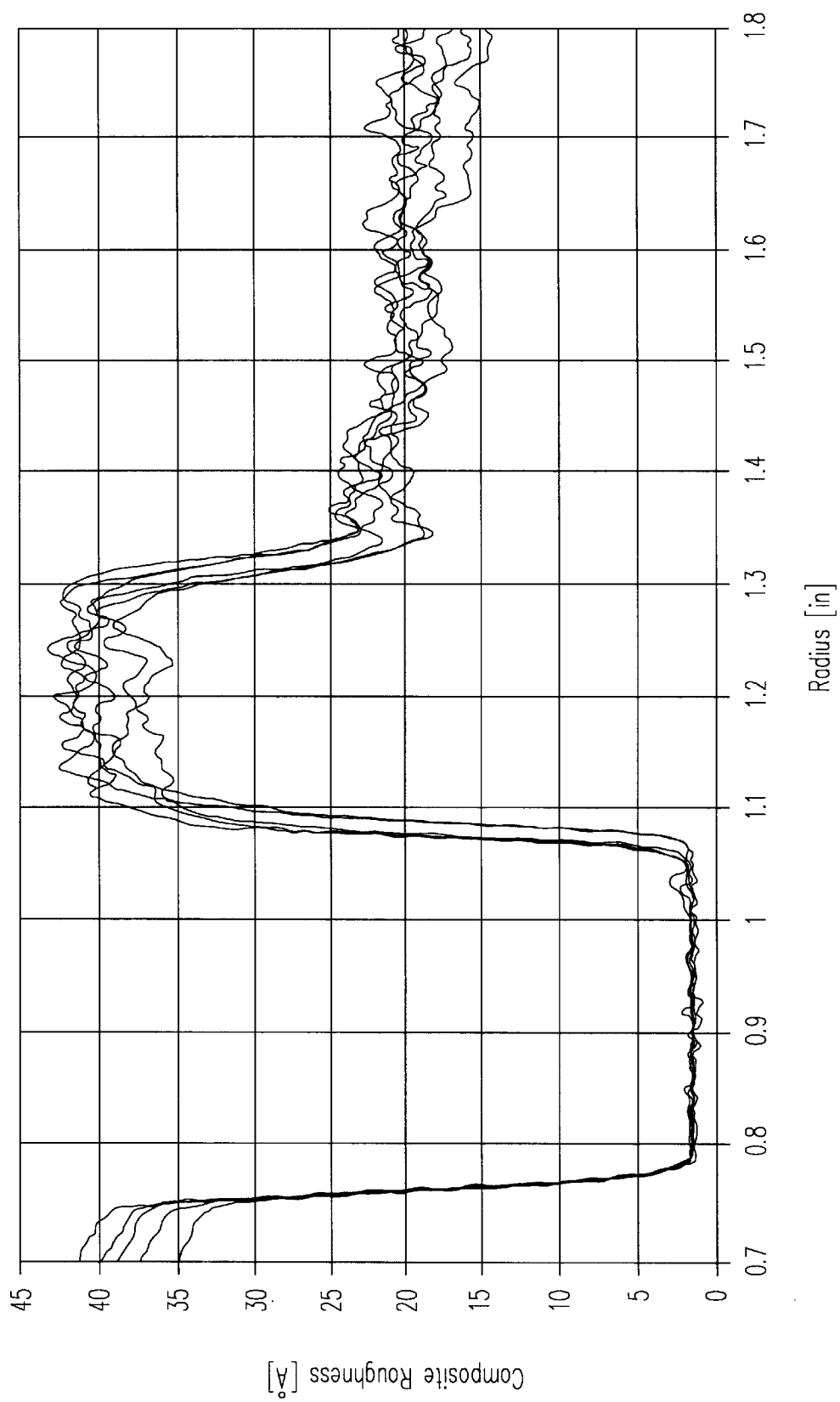
FIG. 8 is a graph showing composite roughness for a calibration disk such as that described herein.

FIG. 8 is a graph of roughness (such as roughness 68, in Å) versus radius for a given calibration disk. As is evident from the graph in FIG. 8, the calibration disk analyzed was configured similarly to calibration disk 10. Referring to the traces depicted in FIG. 8 using the elements of FIGS. 1A and 1B, CSS zone 17 is seen to extend from some indeterminate position near inside diameter 19 to a radius of about 0.75". Band 1 can be seen to extend from about 0.78" to about 1.05", and has a roughness of about 2 Å. Band 2 can be seen to extend from about 1.1" to about 1.3", and has a roughness of between about 35 Å and 45 Å. Band 2 can be seen to extend from about 1.35" to about 1.8", and has a roughness of between about 14 Å and 25 Å. As can also be seen, regions of transition exist (e.g., at a radius of between about 1.05" and about 1.1"), as previously noted.

In relating the roughness plotted in FIG. 8 to the various plots of FIG. 5, it will be noted that the graph in FIG. 5 depicts the various heights measured circumferentially (i.e., along a circle of a given radius, concentric with the disk's inner diameter), and so have an "instantaneous" value at any given point along that radius. In contrast, the roughness measurements plotted in FIG. 8 are measured by sweeping a glide head outward from somewhere near the disk's inner diameter to somewhere near the disks outer diameter. Thus, an "instantaneous" value for the roughness for each of bands 1, 2 and 3 can determined using the roughness plotted for each of bands 1, 2 and 3. For example, the roughness represented by a given plot for a given band can be calculated by averaging the roughness measured at even intervals within the band's plot. Alternatively, the maximum value of a given band's plot can be used as the roughness represented by that plot.

As noted, composite roughness height can be determined from roughness and micro-waviness. Roughness can be determined as noted above. Micro-waviness can be determined using, for example, an interferometric microscope, such as the New-View interferometric microscope available from Zygo of Middlefield, Conn. For the calibration disk of FIG. 8, micro-waviness was measured at about 9.5 Å RMS using wavelengths of between 200 $\mu$m and 1600 $\mu$m (i.e., 1.6 mm). Composite roughness is determined by the following formula:

$$CRH=\sqrt{(M^2 \pm R^2)}$$

where CRH is the composite roughness height, M is the micro-waviness (in Å) and R is the roughness (also in Å). It will be noted that roughness squared can be both added to and subtracted from micro-waviness. This is because roughness and micro-waviness may be either constructive or destructive, and so provides a range of composite roughness heights. Depending on their respective values, micro-waviness or roughness may dominate the value of the resulting composite roughness height.

Thus, where roughness is minimal, the micro-waviness exhibited by the disk will typically dominate in the resulting composite roughness height. For example, within band 1 of the calibration disk of FIG. 8, roughness was measured at about 2 Å, while micro-waviness was measured at about 9.5 Å. In such a case, micro-waviness dominates, and the resulting composite roughness height is seen to vary between about 8 Å and about 12 Å. However, where the roughness is large in comparison to micro-waviness, roughness will tend to control the value of composite roughness height. For example, within band 2 (and band 3) of the calibration disk of FIG. 8, roughness was measured at between about 35 Å and about 45 Å (between about 15 Å and about 25 Å), while micro-waviness was measured at about 9.5 Å. In such a case, roughness dominates, and the resulting composite roughness height is seen to vary between about 35 Å and about 45 Å (between about 15 Å and about 25 Å).

As noted, composite roughness is in the range of between about 2 Å and about 45 Å (or more). In alternate terms, composite roughness can be used to measure fly heights of less than 0.25 $\mu$", and up to about 1.0 $\mu$" (or more). Thus, as the fly heights used in production magnetic disks decrease, the use of composite roughness as a way to measure fly height becomes increasingly attractive. It will be noted that a total integrated scatter technique was used to make the measurements presented in the graph of FIG. 8. This technique is discussed in the article entitled, "Prediction of Glide Avalanche Based on Composite Roughness," by Shoji Suzuki, in Proc. of the 9$^{th}$ International Symposium on Information Storage and Processing Systems, ISPS-Vol. 4, 1998, which is included herein by reference. In fact, an atomic force microscope (AFM) is often used to characterize a disk surface in high resolution. Unfortunately, scanning a disk surface using an AFM takes a substantial amount of time, and consequently, only a few data points are usually available when such a technique is employed, although an AFM may detect finer and/or higher features. A total integrated scatter technique such as that employed herein offers relatively high resolution without the substantial measurement time (and smaller number of data points) encountered in the use of an AFM. For example, in one study, an AFM produced one measurement per surface region of 10 μm×10 μm, whereas a total integrated scatter technique provided an average of 12 measurements sampled from evenly spaced circumferential positions. Because of this averaging, the total integrated scatter technique provided a tighter and more repeatable distribution of data points in comparison to AFM measurements.

Figure 9A:
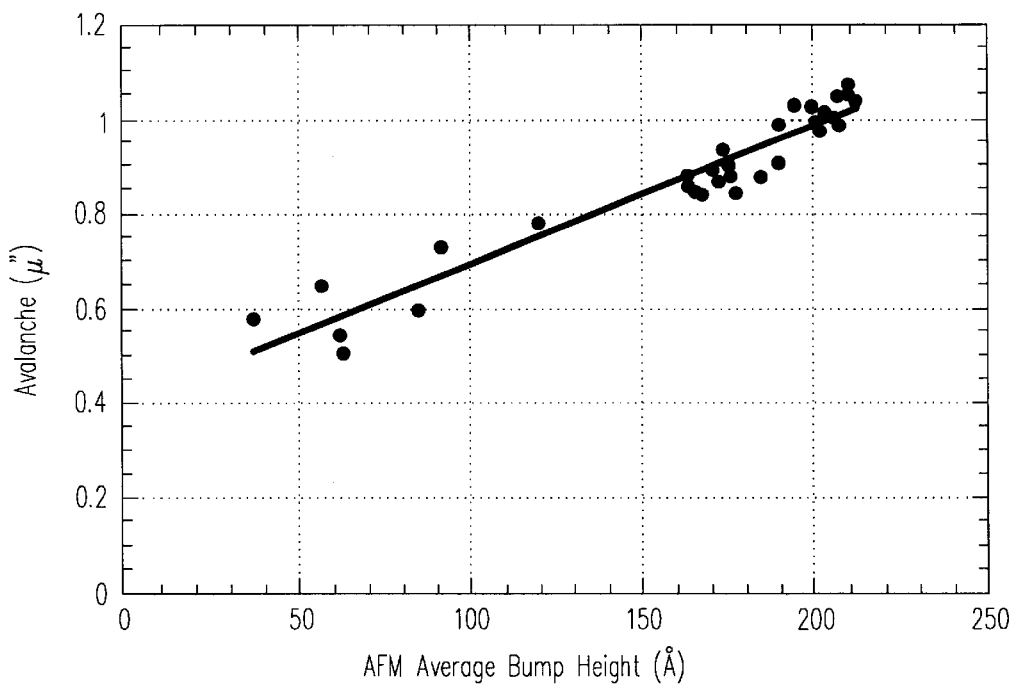
FIGS. 9A and 9B are graphs of average bump height and composite roughness height, versus avalanche, respectively.
Figure 9B:
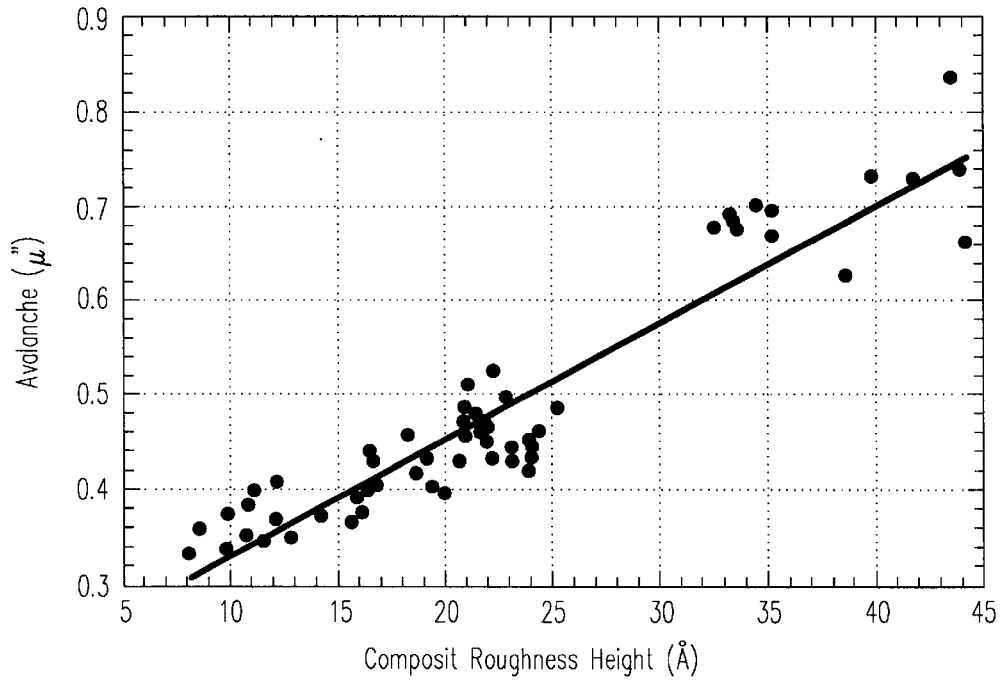

FIGS. 9A and 9B are examples of measurements obtained using laser bumps and composite roughness, respectively. FIG. 9A shows a plot of avalanche height versus average laser bump height. The measurement of laser bump height was made using an AFM and averaged. As can be seen, average laser bump height varied from about 40 Å to about 210 Å, correlating to an avalanche height of between about 0.5 μ" and 1.1 μ". However, most of the average laser bump heights were actually between 160 Å and about 210 Å, correlating to an avalanche height of between about 0.85 μ" and 1.1 μ".

The plot of avalanche height versus composite roughness height depicted in the graph of FIG. 9B shows the utility of composite roughness at such relatively lower fly heights. The graph of FIG. 9B corresponds to the roughness data shown in FIG. 8. As noted, band 1 exhibits composite roughness heights of between about 8 Å and about 12 Å, band 2 exhibits composite roughness heights of between about 35 Å and about 45 Å, and band 3 exhibits composite roughness heights of between about 15 Å and about 25 Å. The clusters of composite roughness heights corresponding to bands 1, 2 and 3 can easily be seen in the graph of FIG. 9B. The corresponding avalanche heights for band 1 are between about 0.34 μ" and about 0.40 μ"; for band 2 are between about 0.62 μ" and about 0.74 μ"; and for band 3 are between about 0.40 μ" and about 0.52 μ". This demonstrates that composite roughness can be used to accurately determine reduced fly heights. The measurements described above with regard to composite roughness height can be used in the estimation of average composite roughness height, in the manner now described.

DISK SURFACE MODELING

Average composite roughness height can be estimated using a number of measurements made on a disk's surface. If such measurements can be made, one can predict an average composite roughness height above the mean surface of a disk on which the fly height of glide head is defined. The average composite roughness height is defined as a function of the height of peaks in the surface defined by composite roughness, the number of which is statistically significant and does not related to extrinsic abnormalities such as contaminants.

Assuming the independence of the various parameters related the disk manufacturing processes and that such parameters exhibit a reasonable degree of statistical control, the overall standard deviation for the combined processes (SD(x)) can be described by the following equations, for example, in three independent variables (a, b, and c).

$$Var(x)=Var(a+b+c)=\sigma_a^2+\sigma_b^2+\sigma_c^2$$

$$SD(x)=SQRT[Var(x)]$$

where x represents the sum of the standard deviations of the independent variables, Var(x) is the overall variance of x, SD(x) is the standard deviation of x and σ is standard deviation (the standard deviations of the independent variables are described below). The standard deviations of three independent parameters are defined as follows:

1. $\sigma_a$: Fly height fluctuation of a glide head

A glide head has appreciable fly height fluctuation when the glide head flies over a thin disk. This is due to the acceleration from disk vibration and runout. By including the fly height fluctuation, the technique accounts for the effect of disk runout on glide avalanche.

2. $\sigma_b$: Disk waviness

The disk waviness is treated as an independent parameter because the initial polishing process typically determines waviness and such waviness is substantially unchanged, even if surface texturing or further fine polishing are performed. This disk waviness includes both waviness and micro-waviness.

3. $\sigma_c$: Texturing

Microscopic features created by mechanical texturing (i.e., roughness) are treated as an independent parameter. Although an AFM is often used to measure roughness in this range (e.g., if the surface is mechanically textured), a light scatter measurement is often more useful because such a technique can give many measurement points nondestructively in a substantially shorter period of time.

Therefore, the distribution of composite roughness heights can be used to determine the overall standard deviation of composite roughness heights. Using the three parameters thus defined, the avalanche height (Av) for a mechanically textured/polished surface can be calculated as follows:

$$Av=3SD[x]$$

The multiplier of three was chosen so as to include in excess of 99% of the composite roughness heights in the Gaussian distribution of such measurements. As will be apparent to one of skill in the art, a larger or smaller multiplier could be used, increasing or decreasing the number of composite roughness heights included in the calculation, respectively.

Figure 10:
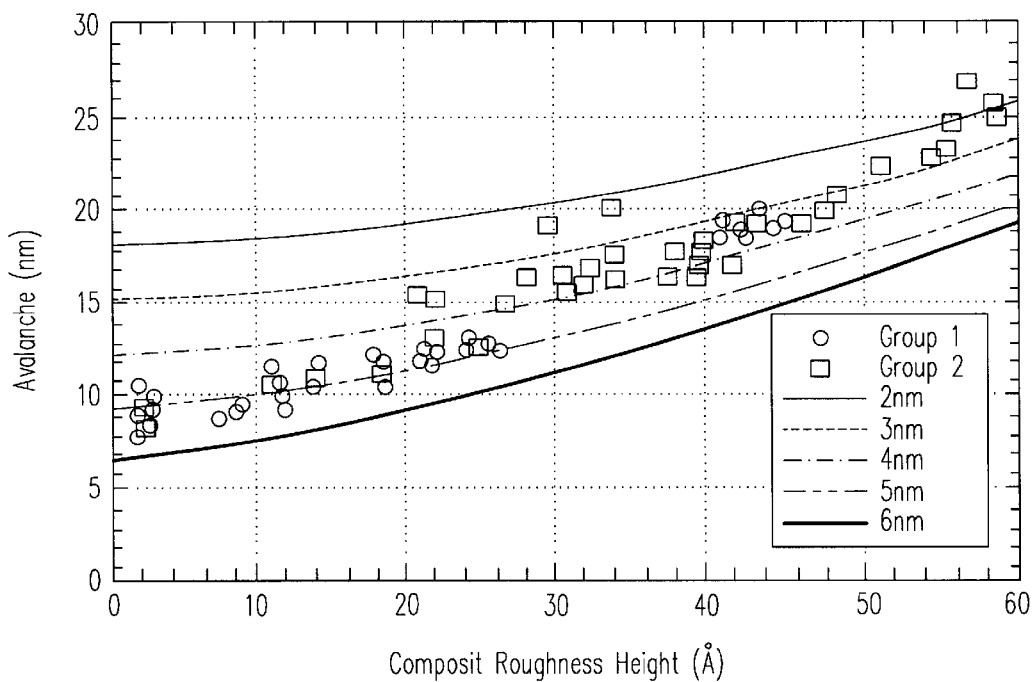
FIG. 10 is a graph of avalanche versus composite roughness.

FIG. 10 is a graph of experimental data, and plots avalanche versus average composite roughness height (in RMS Å). Glide avalanche data (denoted by circles and squares) are plotted as a function of average composite roughness height, together with the calculation results for different waviness levels (denoted by solid and dashed lines). For these calculations, $\sigma_a$ (fly height fluctuation of the glide head) was assumed to be 1 nm. The data corresponding to groups 1 and 2 in FIG. 10 represent two types of aluminum substrate, which were used to achieve different levels of waviness. Group 1 (denoted by circles) exhibits less waviness than Group 2 (denoted by squares). The waviness is between about 2 nm and about 4 nm for Group 1, and between about 3 nm and about 6 nm for Group 2.

The predicted glide avalanche curves derived using the preceding equations agree well with observed values. Moreover, the equations apply well over a broad range of surfaces, from the roughest surfaces (e.g., those of a CSS zone) to the smoothest surfaces (e.g., those suitable for low flying data zones). It will be noted that the disks of Group 1 appear to show a glide avalanche limit around 8 nm and those of Group 2, a glide avalanche limit around 15 nm. These glide avalanche limits can be explained by examining disk waviness. Even if composite roughness is decreased, waviness limits the glide avalanches. Conversely, waviness is not critical if the disk surface is very rough.

DETERMINATION OF FLY HEIGHT

Figure 11:
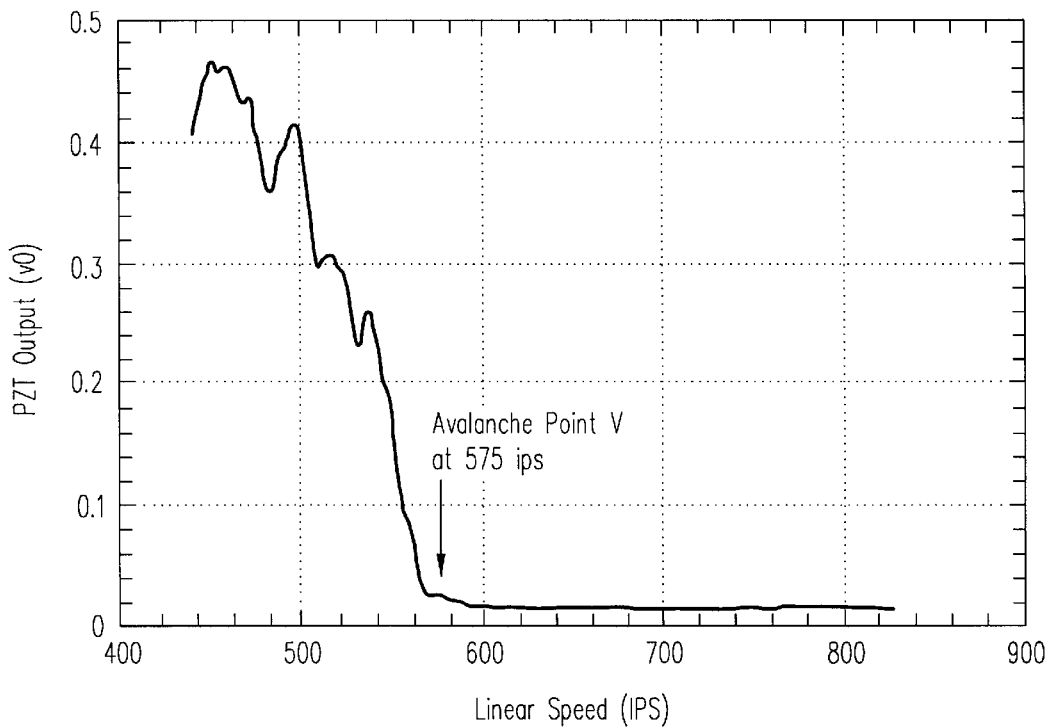
FIG. 11 is a graph of an avalanche curve generated by a PZT output signal as a function of disk linear velocity.

FIG. 11 is an example of an avalanche curve generated by a PZT output signal (the signal generated by the PZT sensor) as a function of disk speed in inches per second (ips). To produce an avalanche curve, the linear velocity of the disk is reduced from a relatively high value to a relatively low value while the glide head is flying over the disk and while monitoring the PZT output signal. In the scenario depicted in FIG. 11, at velocity V (e.g., approximately 575 ips, here) the PZT output signal starts to rise from the noise floor. The linear velocity at which the PZT output signal starts to rise is referred to as the avalanche point. The noise floor is the amplitude of the output signal without any contact and consists of noise of the electrical circuits such as the pre and main amplifier, as well as non-contact noise, such as slider vibration. Below the avalanche point, a typical glide head cannot sustain a no-contact condition because the average composite roughness height of peaks on the surface of the disk are higher than the fly height of the glide head.

As noted, fly height is a function of a disk's linear velocity. The avalanche height and average composite roughness height are also related, and have a linear relationship. Using a conventional fly height tester, the linear velocity at which the avalanche point occurs can be converted into a fly height. Therefore, if one knows the fly height at the avalanche point, one can estimate the average composite roughness height. A fly height tester suitable for such purposes is available, for example, from Phasemetrics. For more information related to fly height testers see the Phasemetrics DFHT Manual 30, 150 Rev. D Nov. 1, 1994.

Figure 12:
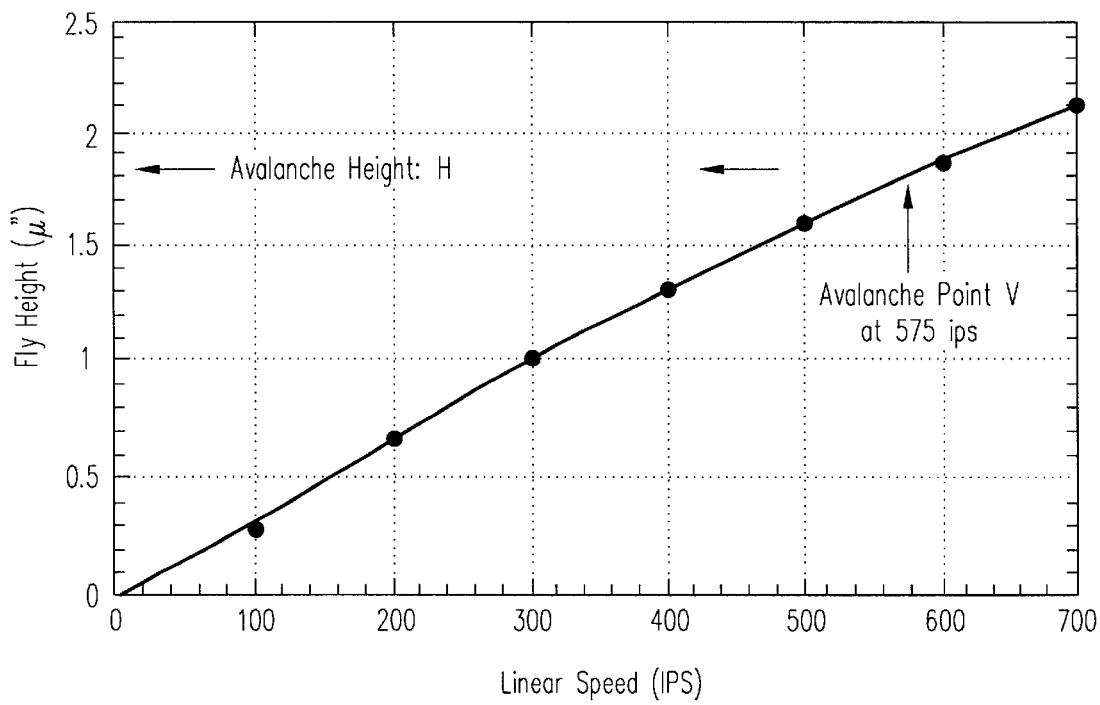
FIG. 12 is a graph of a fly height measurement taken from a conventional fly height tester showing the relation between disk linear velocity and fly height of the glide head.

FIG. 12 shows a plot of fly height as a function of disk speed for a given glide head, as measured with a conventional fly height tester such as the Phasemetrics DFHT. Used in conjunction with the information provided by FIG. 11, the fly height measurements shown in FIG. 12 are used to convert the linear velocity V into the fly height at which the avalanche point occurs (i.e., the avalanche height). For example, as shown in FIG. 12, the linear velocity V is equivalent to a fly height of approximately 1.8 $\mu"$ for the given glide head.

For each calibration band, the avalanche height for multiple glide heads may be correlated with the average composite roughness height for the given calibration band to arrive at a correction factor. This correction factor accounts for the difference between the average composite roughness height and the avalanche height. To determine the correction factor's value, fly heights are determined using a fly height tester. Once fly height measurements are taken, the glide heads are mounted on a glide tester to generate avalanche curves. The position of the glide head is changed band by band on the calibration disk to obtain an avalanche curve for each band, in the manner described in regard to FIG. 11, and so to determine avalanche points (and so avalanche heights) therefor. The avalanche heights thus obtained are then compared with the fly heights measured, e.g., as in FIG. 12. The correction factor is the difference between avalanche height and fly height. Once the fly height versus linear velocity relationship and the correction factor are known, the height of asperities and contaminants (also referred to herein as defects) on production disks can be estimated, and a determination made as to whether a given production disk is of acceptable quality. A production disk is tested at various fly heights by setting the requisite linear velocity for a given fly height (referred to herein as a test linear velocity) using the fly height versus linear velocity relationship. The height of an asperity or contaminant (defined herein as the asperity height) that would contact the glide head at each of these fly heights can be estimated by adjusting the given fly height by the correction factor. Thus, if no contact is detected, it can be stated that any asperities existing on the given production disk have smaller asperity heights than the fly height, as adjusted using the correction factor.

Calibration disk 10 can thus be used to accurately calibrate a glide head, and so to allow the determination of the size of asperities and contaminants on a production disk. The configuration of calibration disk 10 advantageously reduces errors generated by disk waviness, runout, and variances caused by the difference in the disks used in a glide tester and a fly height tester because the calibration disk can be of the same composition as a production disk. However, to obtain the fly height measurement as described in reference to FIG. 12, the glide head must be tested on a fly height tester, and then transferred to a glide tester. Once the glide head is mounted on the glide tester, an avalanche curve is generated. Because each glide head must be independently tested on the fly height tester, the calibration procedure can be time consuming. Advantageously, the use of a fly height tester can be avoided according to further embodiments of the present invention.

IN-SITU CALIBRATION ACCORDING TO EMBODIMENTS OF THE PRESENT INVENTION

Calibration disk 10 can be used to calibrate a glide head while the glide head is on the glide tester by identifying the output signal generated by the lowest point on the glide head contacting calibration disk 10. An independent fly height measurement for the glide head need not be obtained on a separate fly height tester before mounting the glide head on the glide tester when using such a procedure. Calibrating the glide head while mounted on the glide tester simplifies calibration and advantageously eliminates variances caused by the difference between the glide tester and the fly height tester, such as Z height, skew, mount flatness, and disk parameters (e.g., clamping distortion, waviness, runout and the like). To calibrate a glide head with calibration disk 10 without using a fly height tester, one of the following procedures can be performed.

In one embodiment of the present invention, the glide head being calibrated is mounted on a glide tester, such as a model MG250 manufactured by Phasemetrics. A calibration disk (e.g., calibration disk 10) is mounted on the spindle of the glide tester. Avalanche curves are generated for one or more of the calibration bands on calibration disk 10. The linear velocity at the avalanche point (i.e., the linear velocity at which avalanche occurs) is then recorded. Because the average composite roughness height in each band is known, a correlation between the average composite roughness height and the linear velocity at the avalanche points can be obtained. From this correlation, the appropriate linear velocity for a given asperity height can be determined for the now-calibrated glide head. Thus, by varying the linear velocity (and so the asperity height), the height of asperities and contaminants on a production disk can be estimated. It should be noted that, when using an avalanche curve, the lowest point on the glide head should be over the given calibration band to ensure accurate measurements. One way to be certain that this is the case is to create calibration bands that are wider than the total width of the glide head and that the glide head is approximately in the center of the given band.

In another embodiment of the present invention, radial scans are performed over the individual calibration bands of calibration disk 10 to obtain the constant linear velocity (CLV) at which the glide head consistently generates a specific average output signal, such as 0.1 volt (V) (which is known as 0.1V CLV). A radial scan is performed by sweeping the entire glide head (i.e., both rails of the glide head) over the entire width of the given calibration band, in a radial direction. A 0.1V CLV is chosen so as to minimize error caused, for example, by the differing sensitivities of the glide heads being calibrated. In fact, any specific output signal can be used, if desired. Optimally, the output signal at the avalanche point would be used, but, in practice, the accuracy provided by using the avalanche point is limited by noise. Output signals greater than 0.1V CLV, on the other hand, tend to suffer from reduced accuracy due to variations in the glide heads' avalanche curves.

If necessary, different output voltage levels for different bands can be used to compensate for each band's respective base noise level. In the case where a particular calibration band exhibits a high noise level, an output signal can be used that is greater than that used with other bands exhibiting a relatively lower noise level. The results can then be normalized to maintain the linearity of the curve describing output signal versus linear velocity. However, compensating for base noise level is undesirable because such base noise levels can be caused by a defective surface or contamination, and so should not be masked. The need for such compensation is avoided by using bands with similar base noise levels.

When such tests are performed using glide heads having dual rails (e.g., glide head 20), each rail can experience a slightly different linear velocity at a given disk rotational speed (e.g., in rpm) due to the fact that each rail is positioned at a slightly different radius. To account for this difference, a radial scan technique can be employed to account for such differences. Multiple radial scans are performed by sweeping the entire glide head over the entire width of the given calibration band, as noted. The output signal is observed during these scans. The linear velocity of calibration disk 10 is adjusted and the glide head is again swept over the entire width of the band. This process is continued until a linear velocity is found that will consistently generate the desired output signal for the given calibration band (e.g., 0.1V CLV). This process is performed for one or more of the calibration bands. As will be apparent to one of skill in the art, a single-rail glide head can also be employed, thus simplifying to some extent the determination of 0.1V CLV.

A 0.1V CLV (or other CLV/output voltage value) for a glide head is obtained for each of the calibration bands. The 0.1V CLV is the CLV (e.g., in ips) that is necessary to consistently generate a constant 0.1V output signal for a given calibration band, as noted. It will be noted that any number of calibration bands may be used to calibrate a glide head, as long as two or more bands are used, so that a curve describing average composite roughness height versus 0.1V CLV can be determined. As noted, the average composite roughness height for each calibration band can be determined, for example, using the techniques described previously with regard to the modeling of a calibration disk's surface. Once the 0.1V CLV for each calibration band (i.e., average composite roughness height) is known, the glide head can be calibrated with respect to average composite roughness height by determining the relationship between 0.1V CLV and average composite roughness height.

This relationship can be determined in a number of ways. For example, the observed CLV versus average composite roughness height can be plotted, resulting in a number of points that roughly describe the relationship between CLV and average composite roughness height. Once these points are plotted, a curve describing the relationship between 0.1V CLV and average composite roughness height can be estimated using linear regression techniques. The CLV required for a glide head to detect an asperity of a particular height on a production disk (i.e., the CLV for a given asperity height) may thus be determined by using the CLV/average composite roughness height curve (i.e., the CLV for a given average composite roughness height). It can then be stated that if the glide head experiences no impacts (e.g., contact with defects) at a given CLV, any defects are less, in height, than the average composite roughness height corresponding to that CLV. However, a relationship between the velocity of the glide head and the fly height of the glide head is the measure typically employed in industry.

IN-SITU CALIBRATION USING FLY HEIGHT VERSUS CLV

Where calibration of the glide head with respect to fly height is desired, the curve describing 0.1V CLV versus average composite roughness height can be converted to describe a relationship between fly height and CLV by the use of a conversion factor. Thus, the curve relating 0.1V CLV to average composite roughness height can be converted to relate 0.1V CLV to fly height. The fly height corresponding to 0.1V CLV is referred to as the 0.1V Fly Height. The use of a such a conversion factor obviates the need for calibration using a fly height tester, and can be determined in the following manner. The average difference (as measured by CLV, in ips) between the avalanche point and the 0.1V CLV is determined. To determine this difference, the avalanche curves from several glide heads over a given calibration band are aligned by avalanche points. The avalanche curves are aligned so that the avalanche points are zeroed (set equal to 0V). The avalanche curves for multiple glide heads can be averaged to form a single, averaged avalanche curve. By averaging the avalanche curves for all the glide heads, the average avalanche point for the averaged avalanche curve can also be determined. Using the averaged avalanche curve, the average CLV required to generate an output signal of 0.1V (i.e., the average 0.1V CLV for the glide heads) is determined. This is referred to as 0.1V IPS. A value of 0.1V is used because, typically, the error range at 0.1V is much smaller than that of a higher output voltage (e.g., 0.25V). If a higher output voltage is used, the error range increases because of the diverging slopes that such higher output voltages engender in the plot of voltage output versus CLV of the individual glide heads. The position of 0.1V IPS relative to the average avalanche point, in terms of CLV (in ips), can thus be determined, and is referred to herein as $AAP_{IPS}$ (also in ips).

The relationship between average fly height and CLV is determined for a relatively large sampling of glide heads by testing the glide heads in a conventional manner (e.g., approximately 5000 glide heads, tested using a fly height tester). This yields a curve that described average fly height versus CLV for a typical glide head. It will be noted that this curve may be re-used for any number of calibrations, as long as the fly height data remains accurate with respect to the glide head being calibrated. The slope of the fly height versus CLV curve is referred to herein as $m_{FHCLV}$ (in $\mu"$ per ips). The 0.1V Fly Height (an unknown) is below the average avalanche height by an amount (in $\mu"$) equal to $AAP_{IPS}$ (in ips) multiplied by $m_{FHCLV}$ (in $\mu"$ per ips). Thus, although the 0.1V Fly Height is unknown, the difference between 0.1V Fly Height and the average avalanche height (referred to herein as $AAP_{FH}$ (in $\mu"$)) can be determined.

The difference between the average composite roughness height and the fly height at the average avalanche point is also determined. First, avalanche curves are generated for several glide heads, describing output signals versus fly height. By averaging the avalanche curves for these glide heads, an average avalanche point (and so an average avalanche height) for the glide heads can be determined. The average composite roughness height can be determined, for example, in the manner previously described. Thus, the difference between the average composite roughness height and the fly height at the average avalanche point ($AAP_{ACRH}$; in $\mu"$) can be determined. It will be appreciated that, by including additional glide heads and calibration bands having different composite roughness heights, a more accurate average difference determination may be produced. Having determined the values of $AAP_{FH}$, $AAP_{ACRH}$ and the average composite roughness height, the 0.1V Fly Height can now be determined, as described below.

Figure 13:
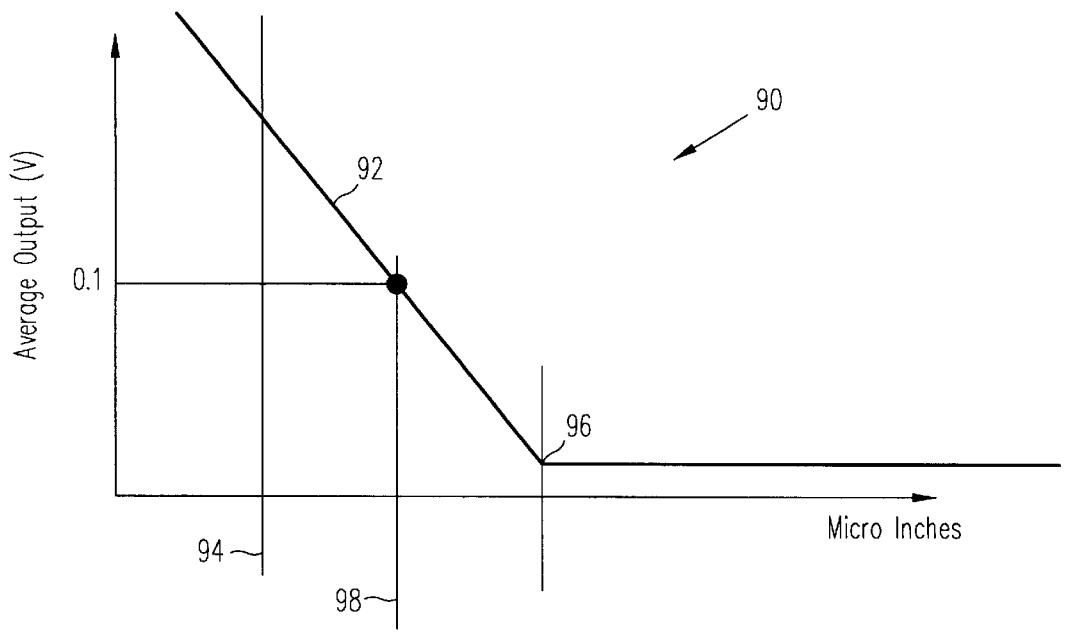
FIG. 13 is a graph of a model avalanche curve for a glide head to convert average composite roughness height to 0.1V Fly Height.

FIG. 13 shows a graph 90 of an idealized avalanche curve 92 that describes average output signal in volts as a function of the fly height in $\mu"$ for a glide head over a given calibration band (i.e., over a surface having a given average composite roughness height). Also shown in graph 90 is an average composite roughness height (ACRH) 94, which is a known quantity, as previously discussed. Also known is that an average avalanche point (AAP) 96 is above a 0.1V Fly Height (FH) 98 by an amount $AAP_{FH}$. As will be apparent to one of skill in the art, the 0.1V Fly Height, taken alone, is not known (and is, in fact, the quantity to be determined). However, $AAP_{FH}$ (the difference between the average avalanche height and the 0.1V Fly Height) can be determined as described previously, and this difference can be used in the determination of the 0.1V Fly Height. Also known is that AAP 96 is above ACRH 94 by an amount $AAP_{ACRH}$. Given these relationships, the 0.1V Fly Height for the given calibration band may be expressed as follows:

$$0.1V\ FH = ACRH + AAP_{ACRH} - AAP_{FH}$$

Thus, the 0.1V Fly Height (the fly height of a glide head generating a 0.1V output signal) over a given calibration band is equal to the average composite roughness height of that calibration band plus the difference between the calibration band's average composite roughness height and the average avalanche height (a known value, as described previously), reduced by the difference between the average avalanche height and the 0.1V Fly Height (a known value, as also described previously). It will be understood that the above conversion factor is accurate for the glide heads and calibration disks employed. If glide heads or calibration disks having substantially different characteristics are employed (e.g., in terms of waviness, runout, clamping methods and the like), a new conversion factor may need to be determined in the manner described above. As before, this procedure is performed for a number of calibration bands (whether on one calibration disk or several). The use of multiple calibration bands provides a number of points, plotted using fly height as a function of CLV. Using these fly height versus CLV points, a fly height versus CLV curve can be created using, for example, linear regression techniques.

Thus, a given glide head can be calibrated on a glide tester using one or more calibration disks having one or more bands exhibiting varying degrees of composite roughness (as measured by average composite roughness height). No independent fly height test on the glide head is required. Once the calibration disk is removed, a production magnetic disk can be tested at a CLV appropriate to the desired fly height and glide head employed.

A calibration disk with discrete bands can thus be used to calibrate a glide head with regard to fly height versus CLV. Because such a calibration disk is physically similar to the production disks being tested, the problems associated with the glass disk of a fly height tester are eliminated. In addition, because the glide head is not re-mounted after the calibration process, productivity is improved, and the possibility of error due to glide head installation differences is eliminated. Moreover, errors in tester setup affecting the fly height can be detected. It will be noted, however, that top and bottom glide heads used to simultaneously test both top and bottom surfaces of a production disk should have similar flight characteristics. Thus, the calibrated top and bottom glide heads should be within an acceptable range for a desired CLV (e.g., $\pm 0.05\mu"$). Where the fly heights of the top and bottom glide heads differ slightly, an average of the two desired velocities can be used. In addition, should it be necessary to check the calibration of a glide head during the testing of production disks, re-calibration can be performed in-situ without the need to remove the glide head (as with the initial calibration). Furthermore, because the signal used in the present invention arises from actual contact, the present invention ensures that the glide head is calibrated at the lowest flying point. Different measures of contact can be used, such as avalanche, or a specific output signal (e.g., 0.1V).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. For example, while calibration of glide heads with calibration disk 10 is described in the present disclosure, it should be understood that calibration disk 10 can similarly be used to assure the real fly height of a magnetic head to be used with production magnetic disks. Furthermore, it is to be understood that the invention is solely defined by the appended claims.

GLOSSARY 0.1V IPS—the average CLV required to generate an output signal of 0.1V, taken from an averaged avalanche curve.

0.1V Fly Height—the fly height of a glide head flying at a CLV that generates an output signal of 0.1V (i.e., a 0.1V CLV).

$AAP_{ACRH}$—the difference between the average composite roughness height and the average avalanche point.

$AAP_{FH}$—the difference between the 0.1V Fly Height and the average avalanche point, stated in $\mu"$.

$AAP_{IPS}$—the difference between the average avalanche point and the 0.1V IPS, stated in ips.

asperity height—the height of an asperity or contaminant that would contact a glide head in flight.

avalanche curve—a plot of the signal generated by a sensor on a glide head (e.g., in volts) versus disk speed (e.g., in inches per second (IPS)).

avalanche height—the height at which a glide head makes contact with the surface of the disk under test.

avalanche point—the point on an avalanche curve at which avalanche (i.e., contact with a disk's surface) occurs.

average avalanche height—an average avalanche height for a number of glide heads.

average avalanche point—(AAP)—an average avalanche point for a number of glide heads.

average composite roughness height—(ACRH)—the average of a number of composite roughness heights, e.g., measured at various points on a given calibration band.

averaged avalanche curve—multiple avalanche curves are aligned so that their avalanche points are at zero, and the avalanche curves are then averaged.

composite roughness height—the deviation of the disk surface from the surface described by waviness of a disk's surface (a combination of micro-waviness and roughness) at a given point on the disk.

constant linear velocity—a single linear velocity at which an output signal maintains a certain level (e.g., 0.1V).

CLV—constant linear velocity (usually in inches per second (ips)).

defect—an asperity or contaminant existing on or in a disk's surface.

disk waviness—the combination of waviness and micro-waviness.

feature size—the distance between peaks.

fly height—(FH)—the height at which a glide head flies above a mean surface height.

fly height tester—determines the fly height of a given glide head over a calibration disk.

glide tester—determines the avalanche height of a given area of a disk; used to perform quality control checks on production disks.

ips—inches per second.

linear velocity—the velocity of a glide head with respect to a disk's surface.

maximum composite roughness height (MCRH)—the maximum height of composite roughness in a given calibration area—an area on a disk used for purposes of calibrating a glide head (e.g., a calibration band).

maximum feature size—the largest possible feature size.

mean surface height—the average position of the surface of a disk.

micro-waviness—variations in disk surface height having a maximum wavelength such that a glide head is not capable of following the surface defined thereby. Also defined as having a maximum wavelength approximately equal to or less than a length that is about the length of a glide head. At a minimum, having a wavelength approximately equal to the feature size of roughness.

radial scan—sweeping an entire glide head (e.g., both rails of the glide head) over a given calibration band, in a radial direction.

roughness—variations in disk surface height having a feature size of less than about 200 $\mu$m.

test linear velocity—the linear velocity of a disk being tested that results in a desired fly height.

waviness—relatively gentle variations in disk surface height that a glide head is capable of following.

wavelength—the average distance between peaks of waviness or micro-waviness.

What is claimed is:

1. A calibration disk for calibrating a head, said calibration disk comprising:
   a calibration area, wherein:
      said calibration area is created by texturing said calibration disk;
      said calibration area includes a plurality of circumferential bands extending substantially concentric to one another;
      each of said circumferential bands has a corresponding composite roughness; and
   wherein said corresponding composite roughness comprises a micro-waviness and a roughness.

2. The calibration disk of claim 1, wherein
   a width of at least one of said circumferential bands is greater than a width of said head.

3. The calibration disk of claim 1, wherein said corresponding composite roughness is greater than about 2 Å in height.

4. The calibration disk of claim 1, wherein said corresponding composite roughness is between about 2 Å and about 45 Å in height.

5. The calibration disk of claim 1, wherein a maximum wavelength of said micro-waviness is less than about a length of said head.

6. The calibration disk of claim 5, wherein a minimum wavelength of said micro-waviness is greater than about a feature size of said roughness.

7. The calibration disk of claim 1, wherein a maximum wavelength of a micro-waviness is such that said head comes into contact with a surface of said calibration disk.

8. The calibration disk of claim 1, wherein a maximum feature size of said roughness is less than about 200 $\mu$m.

9. The calibration disk of claim 1, wherein a maximum feature size of said roughness is less than about 200 $\mu$m.

10. A calibration disk for calibrating a head, said calibration disk comprising:
    a calibration area, wherein:
       said calibration area is created by texturing said calibration disk;
       said calibration area includes a plurality of circumferential bands extending substantially concentric to one another;
       each of said circumferential bands has a corresponding composite roughness; and
    wherein said corresponding composite roughness comprises a micro-waviness.

11. The calibration disk of claim 10, wherein a maximum wavelength of said micro-waviness is less than about a length of said head.

12. The calibration disk of claim 10, wherein a maximum wavelength of a micro-waviness is such that said head comes into contact with a surface of said calibration disk.

13. The calibration disk of claim 10, wherein a maximum feature size of said roughness is less than about 200 $\mu$m.

14. The calibration disk of claim 10, wherein a width of at least one of said circumferential bands is greater than a width of said head.

15. The calibration disk of claim 10, wherein said corresponding composite roughness is greater than about 2 Å in height.

16. The calibration disk of claim 10, wherein said corresponding composite roughness is between about 2 Å and about 45 Å in height.

17. A method of calibrating a glide head with a calibration disk, said method comprising:
    providing a calibration disk, said calibration disk having a calibration area, wherein said calibration area has a composite roughness;
    flying a glide head over said calibration area;
    detecting a substantially constant signal indicative of contact between said glide head and said calibration area;
    recording a recorded linear velocity at which said signal is detected; and
    determining a test linear velocity based upon said recorded linear velocity.

18. The method of claim 16, wherein said detecting a substantially constant signal indicative of contact comprises detecting a signal indicative of an avalanche point.

19. The method of claim 18, wherein said determining said test linear velocity comprises:

correlating a linear velocity of said glide head to a fly height of said glide head;

determining a fly height at which said signal is detected;

calculating a difference between said fly height at which said signal is detected and an average composite roughness height, wherein said composite roughness is defined by said average composite roughness height; and generating said test linear velocity based on an asperity height summed with said difference and correlated to linear velocity with said correlation of said linear velocity to said fly height of said glide head, wherein said asperity height is a height of an asperity to be detected.

20. The method of claim 19, wherein said determining said fly height at which said signal is detected comprises:

determining said fly height at which said signal is detected based on said recorded linear velocity and a correlation of said linear velocity to said fly height of said glide head.

21. The method of claim 17, wherein said calibration disk further comprises a plurality of such calibration areas each of said calibration areas is a circular band, each of said circular bands has a different radius, a composite roughness of at least one of said circular bands differs from a composite roughness of another of said circular bands, and said method is performed using a plurality of said circular bands.

22. The method of claim 21, wherein said detecting said substantially constant signal indicative of contact comprises detecting a signal indicative of an avalanche point.

23. The method of claim 22, said determining said test linear velocity comprises:

determining a linear velocity at an avalanche point for each one of said circular bands;

correlating said linear velocity at said avalanche point for said each one of said circular bands to an average composite roughness height of said each one of said circular bands; and generating said test linear velocity based on an asperity height and a correlation of said linear velocity at said avalanche point for said each one of said circular bands to an average composite roughness height of said each one of said circular bands.

24. The method of claim 21, wherein said flying said glide head over said circular bands comprises performing a radial scan of said disk; and said recording said recorded linear velocity at which said signal is detected comprises recording a linear velocity when said glide head generates an output signal of specific magnitude for each one of said circular bands.

25. The method of claim 24, wherein said determining said test linear velocity comprises:

producing a relationship between said average composite roughness height for each one of said circular bands and said recorded linear velocity; and generating said test linear velocity based on a desired height at which said glide head flies during testing and a relationship between said fly height of said glide head and said linear velocity.

26. The method of claim 25, further comprising:

converting said relationship between said average roughness heights of said circular bands and said recorded linear velocities to a relationship between fly height and linear velocity; and generating said test linear velocity based on said desired fly height of said glide head during testing and a relationship between fly height and said linear velocity.

27. The method of claim 26, wherein said converting said relationship comprises:

adding a conversion factor to said average composite roughness heights to produce fly heights when said output signal is of said specific magnitude; and using curve fitting to generate said relationship between fly height and linear velocity.

28. The method of claim 27, wherein said conversion factor is generated by:

generating a first difference between a linear velocity at an avalanche point and an average linear velocity when an output signal of a glide head is of said specific magnitude;

converting said first difference into an average height difference;

generating a second difference between an average height of an avalanche point and an average composite roughness height; and summing said average height difference and said second difference.

29. A method of creating a calibration disk, said method comprising:

providing a disk;

creating a plurality of calibration areas on said disk by texturing, wherein said texturing creates said plurality of calibration areas as circumferential bands that are substantially concentric to one another, and each of said circumferential bands has a corresponding composite roughness;

wherein said corresponding composite roughness comprises a micro-waviness.

30. The method of claim 29 wherein said texturing is mechanical zone texturing.

31. The method of claim 29, wherein said texturing creates at least one circumferential band with width that is greater than a width of said head.

32. The method of claim 29, wherein said texturing causes said corresponding composite roughness to be greater than about 2 Å in height.

33. The method of claim 29, wherein said texturing causes said corresponding composite roughness to be between about 2 Å and about 45 Å in height.

34. The method of claim 29, wherein a maximum wavelength of said micro-waviness is less than about a length of said head.

35. A method of creating a calibration disk, said method comprising:

providing a disk;

creating a plurality of calibration areas on said disk by texturing, wherein said texturing creates said plurality of calibration areas as circumferential bands that are substantially concentric to one another, and each of said circumferential bands has a corresponding composite roughness;

wherein said corresponding composite roughness comprises a micro-waviness and a roughness.

36. The method of claim 35, wherein a maximum wavelength of said micro-waviness is less than about a length of said head.

37. The method of claim 35, wherein a minimum wavelength of said micro-waviness is greater than about a feature size of said roughness.

38. The method of claim 35, wherein a maximum feature size of said roughness is less than about 200 µm.

39. The method of claim 35 wherein said texturing is mechanical zone texturing.

40. The method of claim 35, wherein said texturing creates at least one circumferential band with width that is greater than a width of said head.

41. The method of claim 35, wherein said texturing causes said corresponding composite roughness to be greater than about 2 Å in height.

42. The method of claim 35, wherein said texturing causes said corresponding composite roughness to be between about 2 Å and about 45 Å in height.

* * * * *